United States Patent [19]
Kamijo

[11] Patent Number: 5,948,553
[45] Date of Patent: Sep. 7, 1999

[54] MAGNETIC MULTILAYER STRUCTURE HAVING MAGNETORESISTANCE RATIO AND LARGE MAGNETIC SENSITIVITY BASED ON THE GIANT MAGNETORESISTANCE EFFECT AND PROCESS OF FABRICATION THEREOF

[75] Inventor: Atsushi Kamijo, Tokyo, Japan

[73] Assignee: NEC Corporation, Tokyo, Japan

[21] Appl. No.: 08/847,508

[22] Filed: Apr. 25, 1997

[30] Foreign Application Priority Data

Apr. 25, 1996 [JP] Japan ................................. 8-105756

[51] Int. Cl.$^6$ ....................................................... G11B 5/39
[52] U.S. Cl. ........................... 428/692; 427/128; 427/130; 204/192.2; 360/113; 338/32 R; 324/252; 428/900
[58] Field of Search ..................... 428/692, 900; 324/252; 338/32 R; 360/113; 204/192.2; 427/128, 130

[56] References Cited

U.S. PATENT DOCUMENTS

| 5,473,492 | 12/1995 | Terunuma et al. ................ 360/128 |
| 5,677,625 | 10/1997 | Dieny ................................. 324/252 |
| 5,780,175 | 7/1998 | Chen et al. ........................ 428/692 |

FOREIGN PATENT DOCUMENTS 0600794  6/1994  European Pat. Off. .

*Primary Examiner*—Stevan A. Resan
*Attorney, Agent, or Firm*—Foley & Lardner

[57] ABSTRACT

A spin valve type multilayered magnetic structure has Fe-base soft magnetic crystalline layer having a mean grain size equal to or less than 30 nanometers and sandwiching a non-magnetic spacer layer, and the Fe-base soft magnetic crystalline layer is expressed as Fe-M-B where M is at least one transition metal selected from the group consisting of Sc, Ti, V, Cr, Y, Zr, Nb, Mo, La, Hf, Ta and W and B is selected from the group consisting of C, B and N; and the spin valve type multilayered magnetic structure achieves a large magnetoresistance ratio equal to or greater than 10.

24 Claims, 17 Drawing Sheets

Fig·13

MAGNETIC MULTILAYER STRUCTURE HAVING MAGNETORESISTANCE RATIO AND LARGE MAGNETIC SENSITIVITY BASED ON THE GIANT MAGNETORESISTANCE EFFECT AND PROCESS OF FABRICATION THEREOF

FIELD OF THE INVENTION

This invention relates to a magnetic multilayered structure and a process of fabrication thereof and, more particularly, to a magnetic multilayered structure of a spin valve type having a large magnetic sensitivity and a large magnetoresistance ratio.

DESCRIPTION OF THE RELATED ART

Permalloy is a typical example of ferromagnetic material having the magnetoresistance effect, and is available for a magnetoresistive transducer such as, for example, a magnetoresistive head. The magnetoresistance effect is a magnetic phenomenon where electrical resistance is varied together with the strength of a magnetic field. If the variation of electrical resistance is dependent on the relative angle between the direction of the magnetization vector of a ferromagnetic body and the direction of electric current, the magnetoresistance effect is called as "anisotropic magnetoresistance effect", and the anisotropic magnetoresistance effect is observed in the permalloy. The permalloy is a standard material for the magnetoresistive head, and a relative change of the resistivity, which is referred to as "magnetoresistance ratio", of the permalloy due to the anisotropic magnetoresistance effect is of the order of 2 to 3 percent.

The storage density of magnetic recording is getting higher and higher, and data recorded at a high memory density is detectable by using a magnetoresistive head with a large magnetoresistance ratio. A magnetic field leaked from a magnetic recording medium is so weak that the magnetoresistive head is expected to show the magnetoresistance in the weak magnetic field. Even if the leakage magnetic field is of the order to 100 oersted or 8 kiloampere/meter, a user expects the magnetoresistive head to have a large magnetoresistance ratio.

A magnetic superlattice structure is an attractive candidate for a giant magnetoresistance. A magnetic superlattice structure has been reported by A. Barthelemy et. al. in "Magnetic and transport properties of Fe/Cr superlattices (invited)", Journal of Applied Physics, volume 67, No. 9, pages 5908 to 5913, May 1, 1990. Ferromagnetic thin layers of Fe are alternated with non-magnetic thin Cr layers so as to form a magnetic superlattice structure, where each thin layer is several angstroms to tens angstroms thick. The superlattice structure achieves the relative resistance change of rate of ten percent due to the magnetoresistance effect.

Another magnetic superlattice structure has been also reported by D. H. Mosca et. al. in "Oscillatory interlayer coupling and giant magnetoresistance in Co/Cu multilayers," Journal of Magnetism and Magnetic Materials, vol. 94, pages L1 to L5, 1991. D. H. Mosca et. al. proposed a magnetic superlattice structure that consisted of ferromagnetic Co thin layers and non-magnetic Cu thin layers. The prior art magnetic superlattice structure also achieved a giant magnetoresistance.

The magnetoresistance of the magnetic superlattice structures formed by alternately stacking ferromagnetic metal layers and non-magnetic metal layers, such as Fe/Cr or Co/Cu results from a so called "antiferromagnetic coupling", in which the magnetization vector between neighboring ferromagnetic layers are antiferromagnetically coupled under a condition where an external magnetic field is not applied thereto. When the magnetic superlattice structure is placed in a magnetic field changed from zero to a certain value, the arrangement of the magnetization vectors of the ferromagnetic thin layers changed from antiferromagnetic to ferromagnetic one. This causes the electric resistance to be decreased. In this instance, there is no dependency of the direction of current. The resistance is changed independent of the relative angle of the magnetic moment between the ferromagnetic thin layers intervened by the non-magnetic thin metallic layer to each other. Thus, the magnetoresistance effect of the magnetic superlattice structure is quite different from the anisotropic magnetoresistance effect of the permalloy, and is called as a "giant magnetoresistance effect".

However, the magnetic superlattice structure encounters a problem in that a large magnetic field is necessary for saturating the magnetoresistance. In fact, the magnetoresistance of the magnetic superlattice structure is saturated at several kilo-oersted to 10 kilo-oersted. Thus, the prior art magnetic superlattice structure is not particularly useful for a magnetoresistive head which is expected to be sensitive to a small change of the magnetic field.

In order to overcome the problem inherent in the prior art magnetic superlattice structure, a spin valve has been proposed. The spin valve has been, by way of example, proposed in Japanese Patent Publication of Unexamined Application of Nos. 2-61572, 4-358310 and 6-60336. The spin valve is formed from two magnetic layers isolated from each other by using a non-magnetic spacer layer. The non-magnetic layer is thick enough to prevent the two magnetic layers from the exchange-coupling. The magnetization direction in one of the two ferromagnetic layers is constrained or maintained in its direction, and the magnetization direction of the other ferromagnetic layer is free to rotate in response to an externally applied magnetic field. The former ferromagnetic layer is called as a "fixed layer", and the latter ferromagnetic layer as a "free layer". The relative angle of the magnetization between two ferromagnetic layers is variable through the turning motion of the magnetization of the free layer, and, accordingly, the variation of the relative angle changes the resistance of the spin valve.

Various approaches have been proposed to fix the magnetization direction in the fixed layer of the spin valve. One of the approaches is to sandwich a non-magnetic spacer layer between two ferromagnetic metallic layers different in coercivities as proposed by A. Chaiken et. al. in "Low-field spin-valve magnetoresistance in Fe-Cu-Co sandwiches", Applied Physics Letters, vol. 59, No. 2, pages 240 to 242, 1991. The paper proposes the sandwiched structure consisting of the ferromagnetic layer with a small coercivity (Fe) and the ferromagnetic layer with a large coercivity (Co) intervened by the non-magnetic spacer layer (Cu). The ferromagnetic layer of Fe, the non-magnetic layer of Cu and the ferromagnetic layer of Co form in combination a spin valve.

Another approach has been proposed by B. Dieny et. al. in "Giant magnetoresistance in soft ferromagnetic multilayers", Physical Review B, vol. 43, No. 1, pages 1297 to 1300, 1991. B. Dieny proposed to form the spin valve by using soft ferromagnetic layers sandwiching a non-magnetic spacer layer, and one of the soft ferromagnetic layers is accompanied with an antiferromagnetic layer. The antiferromagnetic layer gives an exchange-biased magnetic field due to unidirectional anisotropy, and the exchange-biased magnetic field fixes the magnetization direction of the soft ferromagnetic layer adjacent to the antiferromagnetic layer. The other soft ferromagnetic layer is isolated magnetically from the fixed ferromagnetic layer by the non-magnetic spacer layer, and the magnetization direction of the other soft ferromagnetic layer can be freely rotated its direction under the application of an external magnetic field.

Japanese Patent Publication of Unexamined Application No. 4-358310 discloses a similar technology to the second approach, and the soft ferromagnetic layers, the non-magnetic spacer layer and the antiferromagnetic thin film are formed of permalloy, i.e., Ni-Fe alloy, Cu and Fe-Mn alloy, respectively.

The third approach is to provide a ferromagnetic metallic layer attached to both ends of one of the soft ferromagnetic layers sandwiching a non-magnetic spacer layer. The ferromagnetic metallic layer has a large resistivity and a coercivity, and fixes the magnetization direction of the soft ferromagnetic layer. However, the non-magnetic spacer layer isolates the other soft ferromagnetic layer from the ferromagnetic metallic layer, and allows the other soft ferromagnetic layer to rotate the direction of the magnetization under the application of an external magnetic field. A typical example of the third approach is disclosed in Japanese Patent Publication of Unexamined Application No. 6-325934, and proposes to form the soft ferromagnetic layers of Co-Fe alloy, the non-magnetic spacer layer of Cu and the ferromagnetic metallic layer of Co-Pt-Cr alloy, respectively.

The first to third approaches achieve the relative change of the resistivity between 5 percent to 10 percent. The magnetoresistance of the prior art spin valve is independent of the direction of electrical current, but is dependent on the relative angle of magnetic moments between two soft ferromagnetic layers intervened by the non-magnetic spacer layer. Therefore, the magnetoresistance effect in the spin valve is considered to be same as the magnetoresistance effect in the magnetic superlattice structure. A difference from the magnetic superlattice structure is the non-magnetic spacer layer which is thick enough to prevent the soft ferromagnetic layers from the exchange-coupling. Although the magneto-resistance ratio of the spin valve is smaller than that of the magnetic superlattice structure, the spin valve saturates the magneto-resistance in a weak magnetic field, and, accordingly, is quite sensitive to a small variation of magnetic field. For example, the spin valve disclosed in Japanese Patent Publication of Unexamined Application No. 6-60336 is implemented by a multilayered structure consisting of glass/Co of 6 nanometer thick/Cu of 3.2 nanometer thick/Co of 3.4 nanometer thick/FeMn of 10 nanometer thick/Cu of 1 nanometer thick, and gives the magnetoresistance of 8.7 percent in the magnetic field of 20 to 120 oersted. Since the second approach, i.e, the spin valve with the antiferromagnetic layer attached to one of the ferromagnetic layers, is superior in magnetoresistive characteristics to other type spin valves, research and development efforts have been made on the spin valve with the antiferromagnetic layer.

Thus, the magnetic superlattice structure is superior in the magnetoresistance ratio to the spin valve, and the spin valve is superior in the magnetic sensitivity to the magnetic superlattice structure. The storage density of the magnetic recording medium will be further increased, and there is a great demand for a magnetic multilayered structure which achieves both a large magnetoresistance ratio and a large magnetic sensitivity on the manufacturers.

SUMMARY OF THE INVENTION

It is therefore an important object of the present invention to provide a multilayered magnetic structure which achieves a large magnetoresistance ratio and a large magnetic sensitivity.

It is also an important object of the present invention to provide a process of fabricating the multilayered magnetic structure.

The present inventor fabricated the spin valve type multilayered magnetic structures where the mean grain size of Fe-base soft magnetic crystalline layers were changed. The present inventor evaluated the magnetoresistance of the spin valve type multilayered magnetic structure, and noticed that mean grain size strongly affected the giant magnetoresistance effect. The present inventor concluded that the mean grain size of a certain range resulted in a large magnetoresistance ratio.

To accomplish the object, the present invention proposes to form magnetic layers of Fe-base alloy having the means grain size equal to or less than 30 nanometers.

In accordance with one aspect of the present invention, there is provided a multilayered magnetic structure comprising: a first magnetic layer formed of an Fe-base magnetic crystalline alloy having a first composition expressed by as Fe-M-X where M is at least one transition metal selected from the group consisting of Sc, Ti, V, Cr, Y, Zr, Nb, Mo, La, Hf, Ta and W and X is at least one element selected from the group consisting of C, B and N, the Fe-base magnetic crystalline alloy having a mean grain size equal to or less than 30 nanometers; a second magnetic layer opposed to the first magnetic layer so as to change a relative angle of magnetization vector between the first magnetic layer and the second magnetic layer in the presence of an external magnetic field; and a non-magnetic spacer layer sandwiched between the first magnetic layer and the second magnetic layer.

The transition metal may range from 2 percent to 13 percent by atom, and the element X may range from 0.5 percent to 18 percent by atom.

In accordance with another aspect of the present invention, there is provided a process of fabricating a multilayered magnetic structure, comprising the steps of: a) preparing a substrate; b) forming a multilayered magnetic structure serving as a spin valve on a major surface of the substrate at a certain temperature equal to or less than −50 degrees in centigrade under application of a first magnetic field in parallel to the major surface of the substrate; and c) annealing the multilayered magnetic structure in vacuum.

BRIEF DESCRIPTION OF THE DRAWINGS

The features and advantages of the magnetic multilayered structure and the process of fabrication thereof according to the present invention will be more clearly understood from the following description taken in conjunction with the accompanying drawings in which.

DESCRIPTION OF THE PREFERRED EMBODIMENTS

First Embodiment

Figure 1:
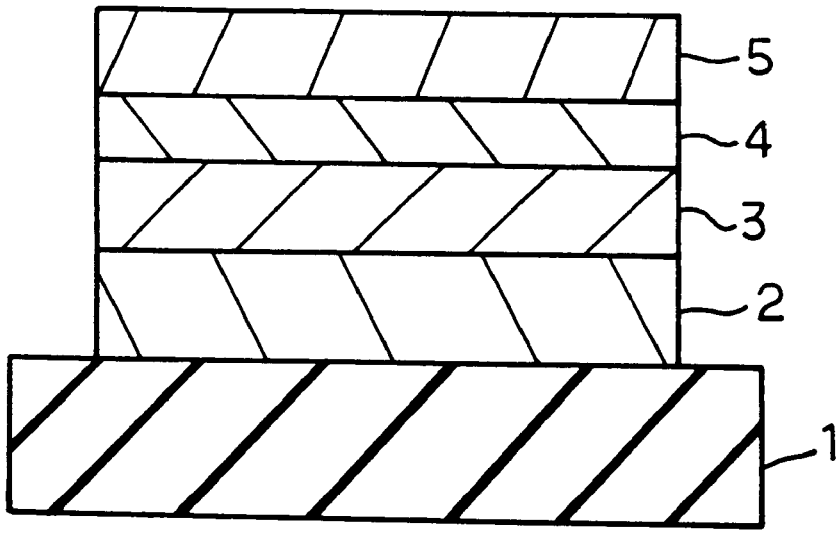
FIG. 1 is a cross sectional view showing the structure of a magnetic multilayered structure according to the present invention.

Referring first to FIG. 1 of the drawings, a multilayered magnetic structure embodying the present invention is fabricated on a substrate 1 of glass. The multilayered magnetic structure shown in FIG. 1 is categorized in the spin valve. The substrate 1 may be formed of ceramic or semiconductor material such as, for example, silicon.

The substrate 1 is overlain by an antiferromagnetic layer 2, and a lower Fe-base soft magnetic crystalline layer 3, a non-magnetic spacer layer 4 and an upper Fe-base soft magnetic crystalline layer 5 are successively laminated on the substrate 1. The lower Fe-base soft magnetic crystalline layer 3 and the upper Fe-base soft magnetic crystalline layer 5 are formed of Fe-base alloy, and the mean grain size of the Fe-base alloy is equal to or less than 30 nanometers. The non-magnetic spacer layer 4 is formed of Cu, Ag or Cu-base alloy with mean grain size equal to or less than 30 nanometer.

The composition of the Fe-base alloy is soft magnetic material expressed as Fe-M-X. Fe is iron, and M represents one or more than one transition metal selected from the group consisting of Sc, Ti, V, Cr, Y, Zr, Nb, Mo, La, Hf, Ta and W. On the other hand, X represents one or more than one element selected from the group consisting of C, B and N. The element "X" is liable to react with the transition metal or metals. The element "M" ranges from 2 percent to 13 percent by atom, and the element "X" falls within the range between 0.5 percent to 18 percent by atom.

The Fe-base magnetic alloy expressed as Fe-M-X has a relatively large saturation magnetic flux density, and forms a soft magnetic thin film. Japanese Patent Publication of Unexamined Application No. 3-132004 discloses a Fe-Ta-C soft magnetic layer having a large saturation magnetic flux density. The soft magnetic material used in the multilayered magnetic structure according to the present invention preferably has the saturation magnetic flux density equal to or greater than 1.2 teslas. If the element "M" and the element "X" are out of the range between 2 percent and 13 percent by atom and the range between 0.5 percent and 18 percent by atom, the saturation magnetic flux density becomes less than 1.2 teslas, and the small saturation magnetic flux density results in a small change rate of magnetoresistance ratio of the order of 5 percent.

The Cu-base alloy is expressed as Cu-Ag-Me, and Me is one or more than one element selected from the group consisting of Si, Ge and P. Ag ranges from 15 percent to 90 percent by atom, and Me falls within the range between 5 percent to 40 percent by atom.

The antiferromagnetic layer 2 is held in contact with the lower Fe-base soft magnetic crystalline layer 2, and fixes the magnetization direction of the lower Fe-base soft magnetic crystalline layer 3. The non-magnetic spacer layer 4 magnetically isolates the upper Fe-base soft magnetic crystalline layer 5 from the antiferromagnetic layer 2, and, for this reason, the upper Fe-base soft magnetic crystalline layer 5 changes the direction of magnetization together with variation of a magnetic field.

A two-current model gives a good qualitative understanding for the giant magnetoresistance effect. According to the two-current model, transition metal ferromagnetic material is different in scattering potential between the up spin conduction electrons and a down spin conduction electrone, and the resistivity in the ferromagnetic material is given as a parallel resistivity the resistivity due to the up spin conduction electron channel and the resistivity due to the down spin conduction electron channel. The spin-dependent scattering takes place at the interface between the magnetic layer and the non-magnetic layer in the magnetic superlattice or the spin valve, and the resistance in the magnetic superlattice structure or the spin valve is varied between the ferromagnetic state and the antiferromagnetic state. This results in the giant magnetoresistance effect. The magnitude of the magnetoresistance ratio is material dependent, and is derived from the scattering potential.

Although the reason why the nano-crystal structure of the magnetic layer achieves a larger magnetoresistance ratio than the known magnetoresistance ratio does not presently reach a perfect understanding, the present inventor thinks that the nano-sized grains enhance the spin-dependent scattering. This means that the spin valves consisting of nano-sized grains increase the resistivity difference between the resistivity due to the up spin donduction electron and the resistivity due to the down spin conduction electron.

The present inventor confirmed that the Fe-base soft magnetic crystalline layers with the mean grain size equal to or less than 30 nanometers achieved a large magnetoresistance ratio equal to or greater than 10 percent. However, if the mean grain size exceeded 30 nanometers, the change rate of magneto-resistance was rapidly decreased. Thus, the mean grain size equal to or less than 30 nanometers was the indispensable feature for a large change rate equal to or greater than 10 percent.

Figure 2:
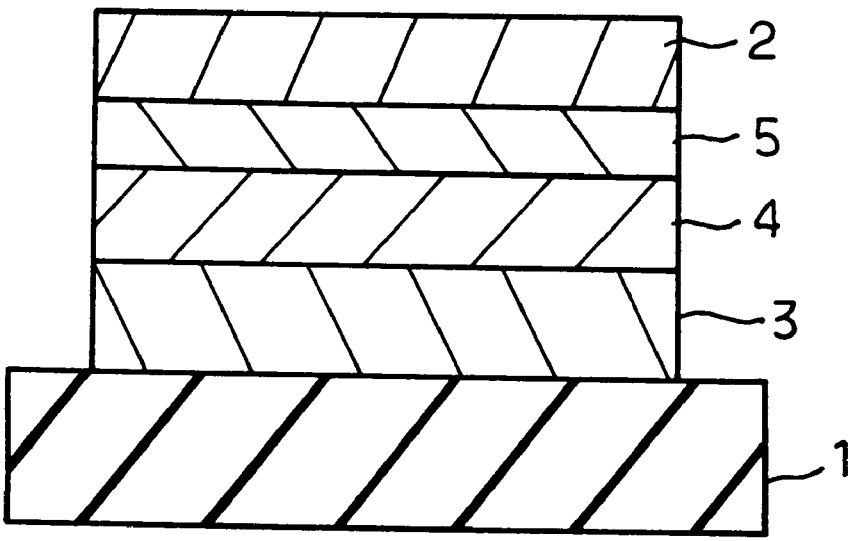
FIG. 2 is a cross sectional view showing the structure of a first modification of the magnetic multilayered structure shown in FIG. 1.

FIG. 2 illustrates the first modification of the magnetic multilayered structure shown in FIG. 1. In the first modification, the lower Fe-base soft magnetic crystalline layer 2 is directly formed on the major surface of the substrate 1, and the upper Fe-base soft magnetic crystalline layer 5 is overlain by the antiferromagnetic layer 2. For this reason, the antiferromagnetic layer 2 fixes the magnetization direction of the upper Fe-base soft magnetic crystalline layer 5, and the magnetization vector of the lower Fe-base soft magnetic crystalline layer 2 is frely rotated by an external magnetic field.

Figure 3:
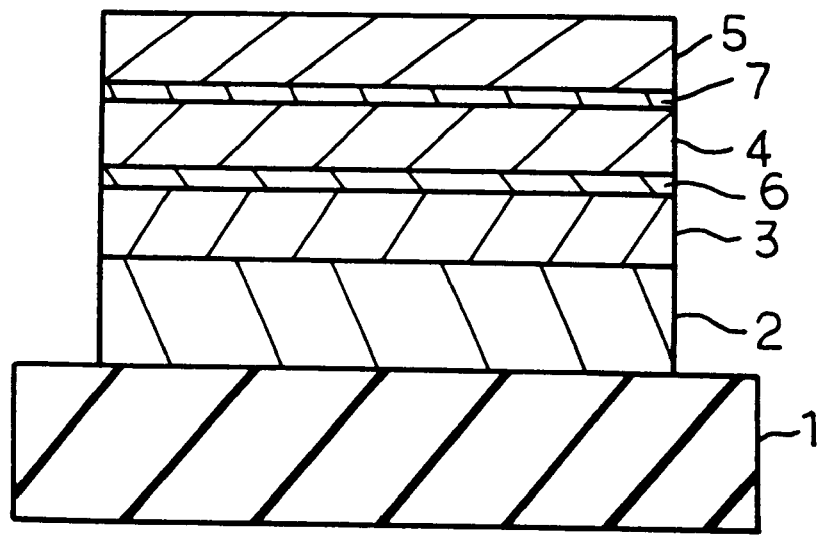
FIG. 3 is a cross sectional view showing the structure of a second modification of the magnetic multilayered structure shown in FIG. 1.

FIG. 3 illustrates the second modification of the magnetic multilayered structure shown in FIG. 1. The second modification further comprises a lower Co-base magnetic crystalline layer 6 and an upper Co-base magnetic crystalline layer 7. The lower Co-base magnetic crystalline layer 6 and the upper Co-base magnetic crystalline layer 7 are formed of Co-base alloy, and the mean grain size of the Co-base alloy is equal to or less than 30 nanometers. The lower Co-base magnetic crystalline layer 6 is inserted between the lower Fe-base soft magnetic crystalline layer 3 and the non-magnetic spacer layer 4, and the upper Co-base magnetic crystalline layer 7 is inserted between the non-magnetic spacer layer 4 and the upper Fe-base soft magnetic crystalline layer 5.

The Co-base alloy is expressed as Co-M-B. M is one or more than one element selected from the group consisting of Sc, Ti, V, Cr, Y, Zr, Nb, Mo, La, Hf Ta and W. Co is cobalt, and B is boron. The element "M" ranges from 2 percent to 13 percent by atom, and boron ranges between 5 percent to 25 percent by atom.

The present inventor evaluated that the Co-base magnetic crystalline layer enhanced the change rate of magneto-resistance. The reason why the Co-base magnetic crystalline layer enhanced the magnetoresistance ratio is considered to increase the spin-dependent scattering.

The Co-base magnetic crystalline layer 6/7 ranges from 0.1 nanometer thick to 1.0 nanometer thick. If the Co-base magnetic crystalline layer 6/7 is thicker than 1.0 nanometer, the magnetoresistance ratio is not enhanced.

Figure 4:
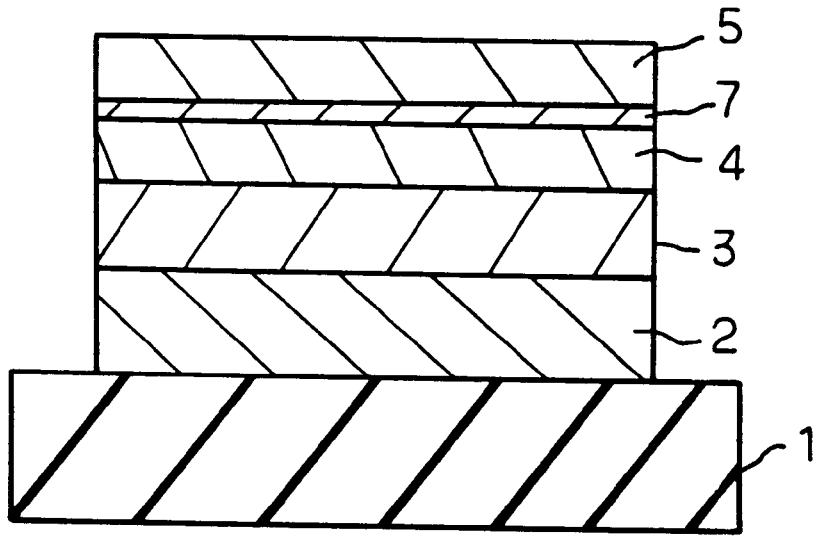
FIG. 4 is a cross sectional view showing the structure of a third modification of the magnetic multilayered structure shown in FIG. 1.
Figure 5:
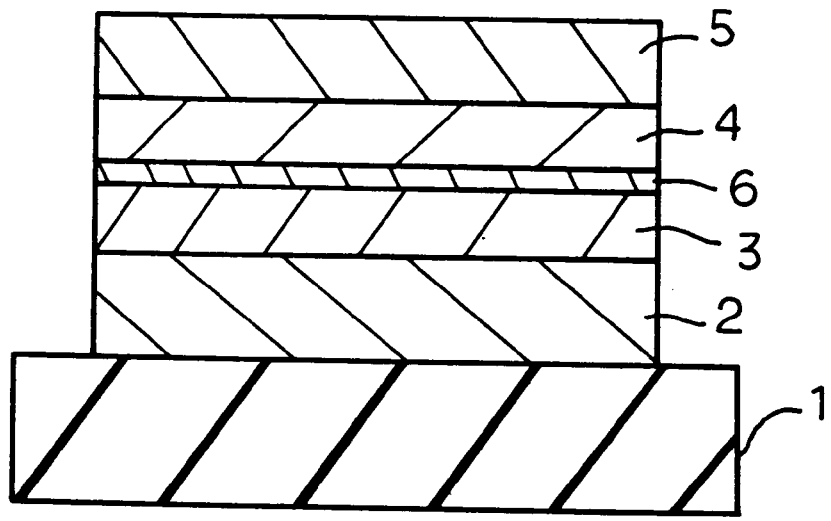
FIG. 5 is a cross sectional view showing the structure of a fourth modification of the magnetic multilayered structure shown in FIG. 1.

FIGS. 4 and 5 illustrate the third modification and the fourth modification, respectively. The third modification shown in FIG. 4 has the upper Co-base magnetic crystalline layer 7, and the lower Co-base magnetic crystalline layer 6 is deleted from the third modification. On the other hand, the fourth modification shown in FIG. 5 has the lower Co-base magnetic crystalline layer 6, and the upper Co-base magnetic crystalline layer 7 is deleted from the fourth modification. Even if one of the lower/upper Co-base magnetic crystalline layers 6/7 is deleted from the multilayered magnetic structure, the remaining Co-base magnetic crystalline layer 7/6 enhances the magneto-resistance ratio.

The both of or one of the lower/upper Co-base magnetic crystalline layers 6/7 may be inserted into the multilayered magnetic structure shown in FIG. 2.

Second Embodiment

Figure 6:
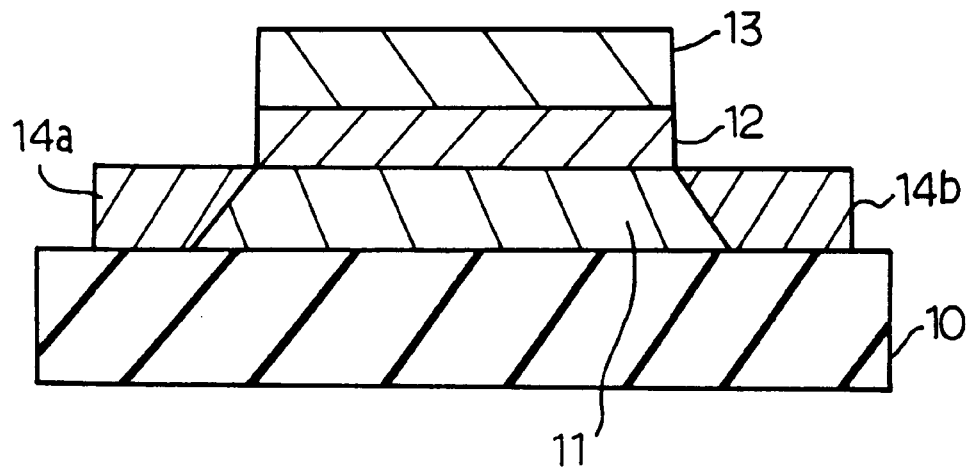
FIG. 6 is a cross sectional view showing the structure of another magnetic multilayered structure according to the present invention.

Turning to FIG. 6 of the drawings, another multilayered magnetic structure embodying the present invention is fabricated on a substrate 10. The substrate 10 is also formed of the glass, ceramic or semiconductor material. The multilayered magnetic structure serves as the another kind of the spin valve different from the spin valve shown in FIG. 1.

The multilayered magnetic structure comprises a lower Fe-base soft magnetic crystalline layer 11 formed on the substrate 10, a non-magnetic spacer layer 12 formed on the lower Fe-base soft magnetic crystalline layer 11, an upper Fe-base soft magnetic crystalline layer 13 formed on the non-magnetic spacer layer 12 and ferromagnetic blocks 14a/14b attached to both ends of the lower Fe-base soft magnetic crystalline layer 11. The lower/upper Fe-base soft magnetic crystalline layers 11/13 are formed of the Fe-base alloy described in connection with the first embodiment, and the non-magnetic spacer layer 12 is also formed of Cu, Ag or Cu-base alloy with the mean grain size equal to or less than 30 nanometers.

The ferromagnetic blocks 14a and 14b fixes the direction of magnetization in the lower Fe-base soft magnetic crystalline layer 11, and the magnetization direction of the upper Fe-base soft magnetic crystalline layer 13 is rotated changes by an external magnetic field.

The Fe-base alloy increases the magnetoresistance ratio of the multilayered magnetic structure, and makes the multi-layered magnetic structure highly sensitive to variation of the external magnetic field. Thus, the spin valve type multilayered magnetic structure implementing the second embodiment achieves all the advantages of the first embodiment.

Figure 7:
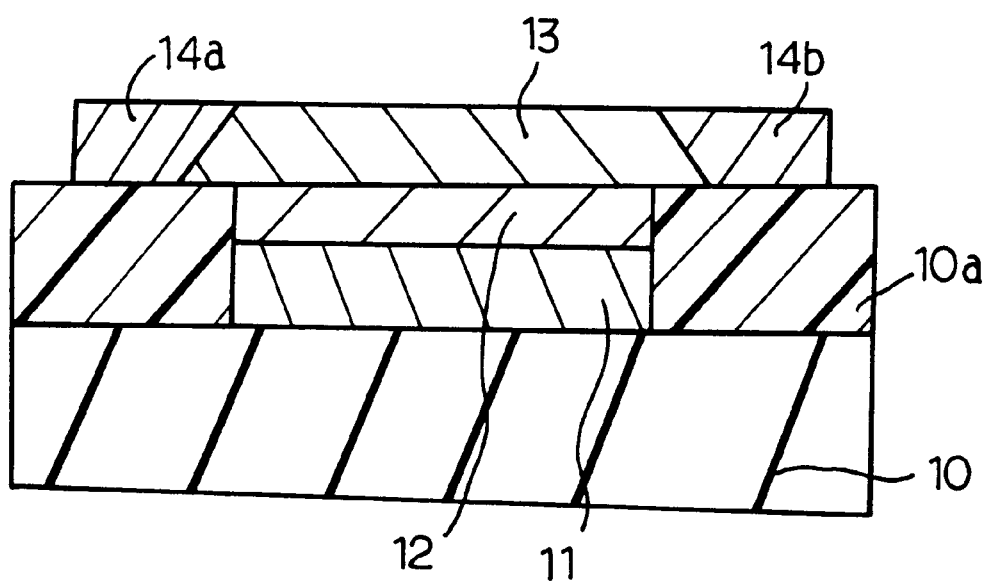
FIG. 7 is a cross sectional view showing the structure of a first modification of the magnetic multilayered structure shown in FIG. 6.

The multilayered magnetic structure shown in FIG. 6 is modified as follows. The first modification has the ferromagnetic blocks 14a and 14b attached to both sides of the upper Fe-base soft magnetic crystalline layer 13 as shown in FIG. 7. The ferromagnetic blocks 14a/14b fixes the magnetization direction of the upper Fe-base soft magnetic crystalline layer 13 to a certain direction, and the magnetization direction of the lower Fe-base soft magnetic crystalline layer 11 is rotated by an external magnetic field. The Fe-base soft magnetic crystalline layer 11 and the non-magnetic spacer layer 12 are embedded in a resist layer 10a formed on the substrate 10.

Figure 8:
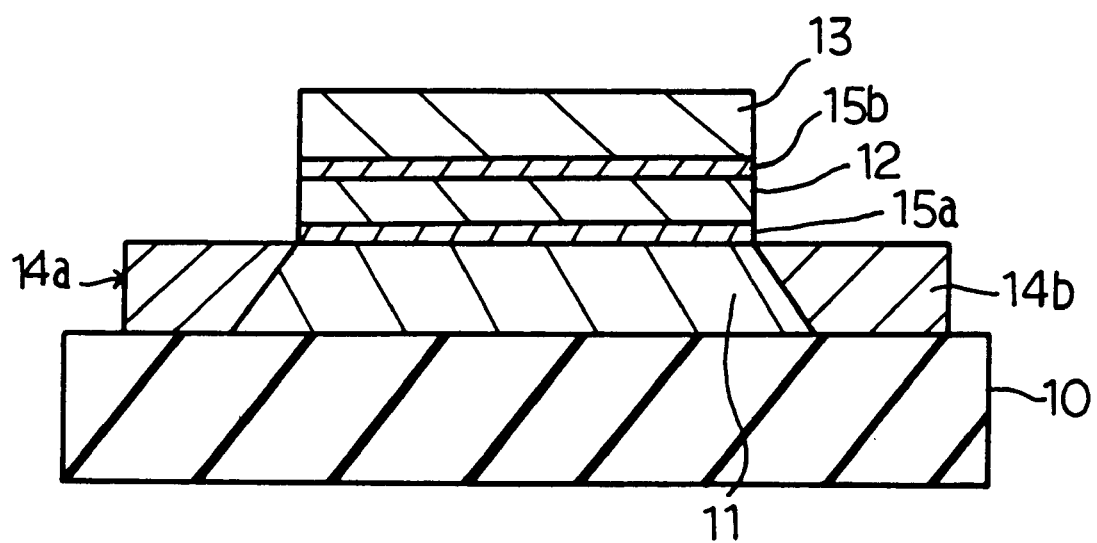
FIG. 8 is a cross sectional view showing the structure of a second modification of the magnetic multilayered structure shown in FIG. 6.

The second modification is illustrated in FIG. 8. A lower Co-base magnetic crystalline layer 15a is inserted between the lower Fe-base soft magnetic crystalline layer 11 and the non-magnetic spacer layer 12, and an upper Co-base magnetic crystalline layer 15b is inserted between the non-magnetic spacer layer 12 and the upper Fe-base soft magnetic crystalline layer 13. The lower/upper Co-base magnetic crystalline layers 15a and 15b are formed of the Co-base alloy described in connection with the first embodiment, and enhance the magnetoresistance ratio.

Figure 9:
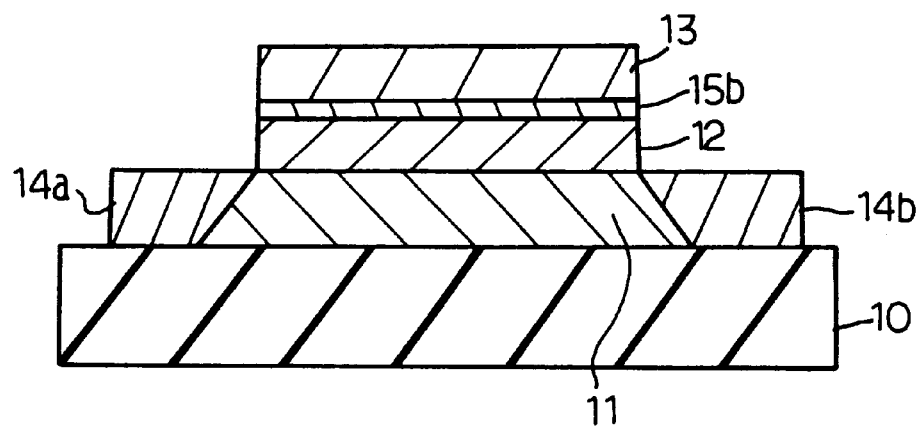
FIG. 9 is a cross sectional view showing the structure of a third modification of the magnetic multilayered structure shown in FIG. 6.
Figure 10:
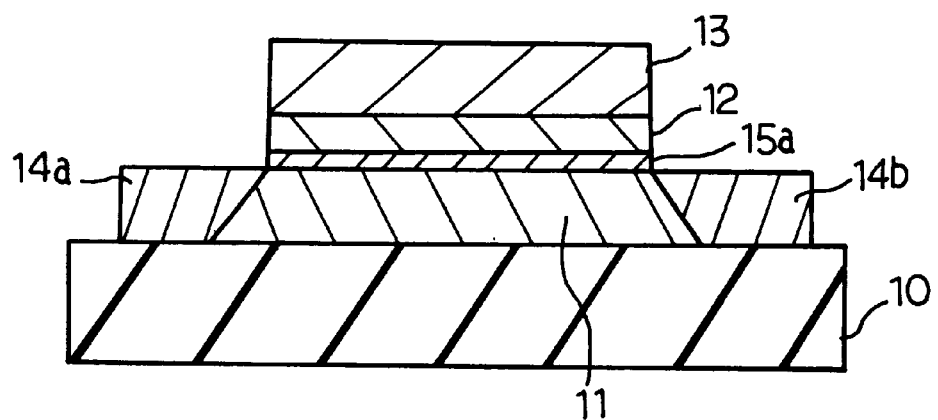
FIG. 10 is a cross sectional view showing the structure of a fourth modification of the magnetic multilayered structure shown in FIG. 6.

FIGS. 9 and 10 illustrate the third modification and the fourth modification, respectively. The third modification shown in FIG. 9 has the upper Co-base magnetic crystalline layer 15b, and the lower Co-base magnetic crystalline layer 15a is deleted from the third modification. On the other hand, the fourth modification shown in FIG. 10 has the lower Co-base magnetic crystalline layer 15a, and the upper Co-base magnetic crystalline layer 15b is deleted from the fourth modification. Even if one of the lower/upper Co-base magnetic crystalline layers 15a/15b is deleted from the multilayered magnetic structure, the remaining Co-base magnetic crystalline layer 15b/15a enhances the magneto-resistance ratio.

Both of or one of the lower/upper Co-base magnetic crystalline layers 15a/15b may be inserted into the multi-layered magnetic structure shown in FIG. 7.

Third Embodiment

Figure 11:
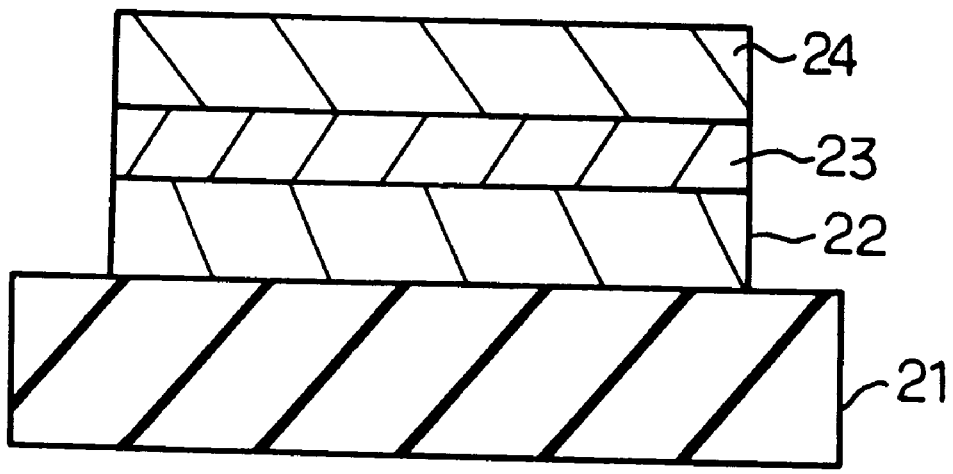
FIG. 11 is a cross sectional view showing the structure of yet another magnetic multilayered structure according to the present invention.

Turning to FIG. 11 of the drawings, yet another multi-layered magnetic structure embodying the present invention is fabricated on a substrate 21. The multilayered magnetic structure serves as a spin valve different from the spin valves shown in FIGS. 1 and 6.

The multilayered magnetic structure implementing the third embodiment comprises a lower magnetic layer 22 formed on the substrate 21, a non-magnetic spacer layer 23 formed on the lower magnetic layer 22 and an upper Fe-base soft magnetic crystalline layer 24 formed on the non-magnetic spacer layer 23. The lower magnetic layer 22 is formed of a certain magnetic material such as, for example, Co-Cr-Ta alloy, and the upper Fe-base soft magnetic crystalline layer 24 is formed of the Fe-base alloy described in connection with the first embodiment. The lower magnetic layer 22 is larger in coercive force than the upper Fe-base soft magnetic crystalline layer 24, and the Fe-alloy has the mean grain size equal to or less than 30 nanometers. The non-magnetic spacer layer 23 is formed of Cu, Ag or the Cu-base alloy with the mean grain size equal to or less than 30 nanometers.

The Fe-base alloy increases the magnetoresistance ratio of the multilayered magnetic structure, and makes the multi-layered magnetic structure highly sensitive to variation of the magnetic field. Thus, the spin valve type multilayered magnetic structure implementing the third embodiment achieves all the advantages of the first embodiment.

Figure 12:
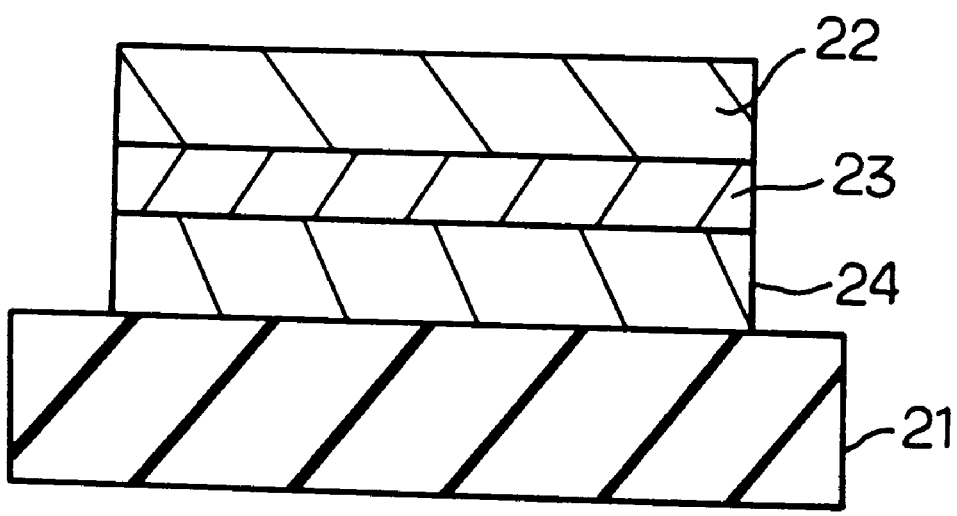
FIG. 12 is a cross sectional view showing the structure of a first modification of the magnetic multilayered structure shown in FIG. 11.

The multilayered magnetic structure shown in FIG. 11 is modified as follows. FIG. 12 illustrates the first modification, and the magnetic layer 22 with a large coer-cive force and the Fe-base soft magnetic crystalline layer 24 are replaced with each other in the first modification.

Figure 13:
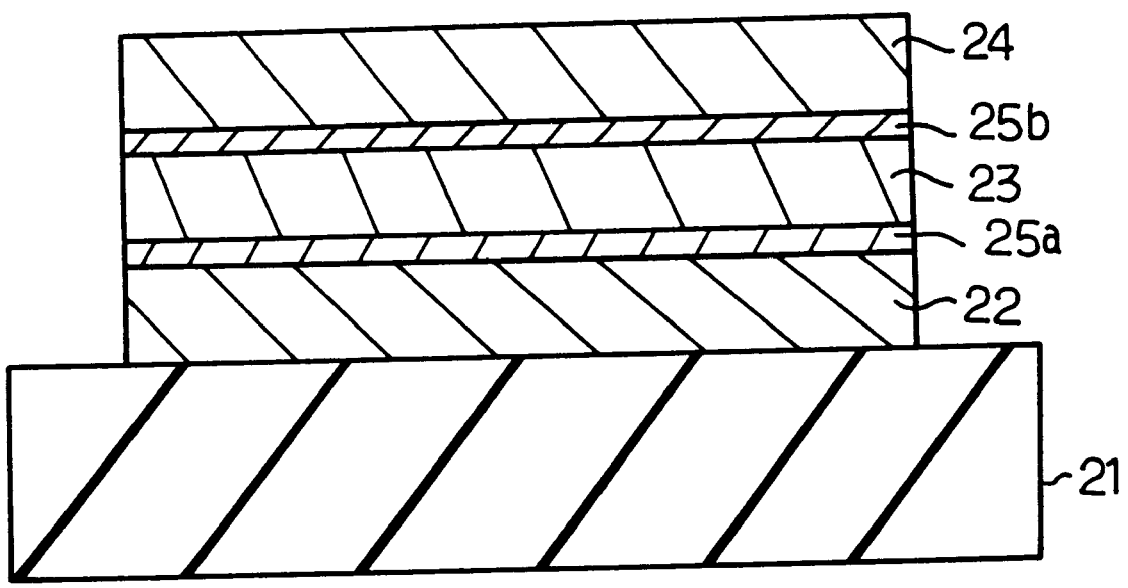
FIG. 13 is a cross sectional view showing the structure of a second modification of the magnetic multilayered structure shown in FIG. 11.

The second modification is illustrated in FIG. 13. A lower Co-base magnetic crystalline layer 25a is inserted between the lower magnetic layer 22 and the non-magnetic spacer layer 23, and an upper Co-base magnetic crystalline layer 25b is inserted between the non-magnetic spacer layer 23 and the upper Fe-base soft magnetic crystalline layer 24. The lower/upper Co-base magnetic crystalline layers 25a and 25b are formed of the Co-base alloy described in connection with the first embodiment, and enhance the magnetoresis-tance ratio.

Figure 14:
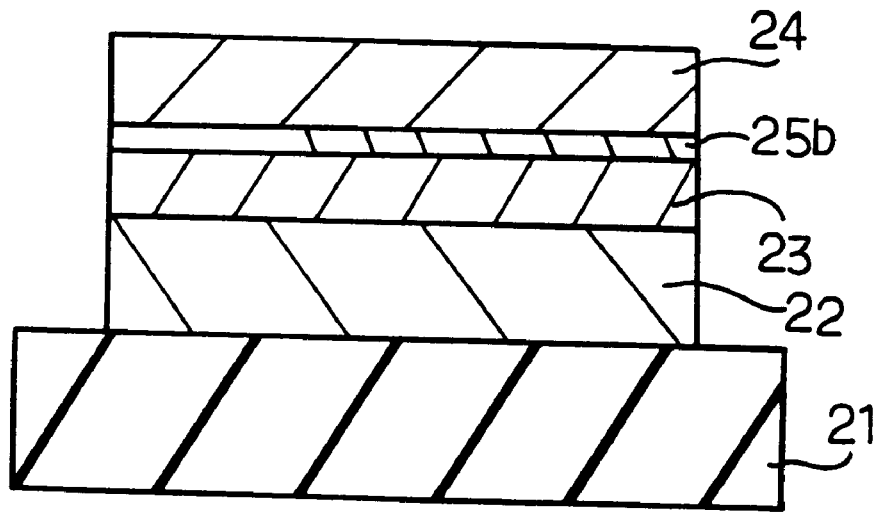
FIG. 14 is a cross sectional view showing the structure of a third modification of the magnetic multilayered structure shown in FIG. 11.
Figure 15:
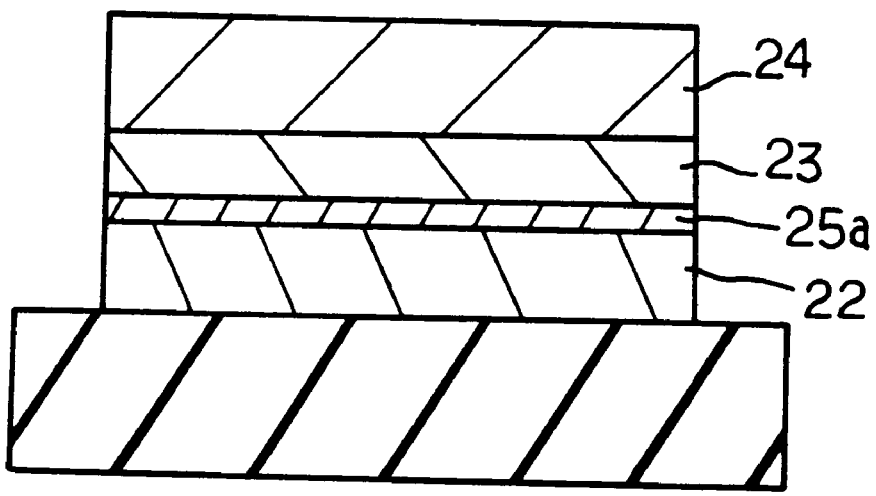
FIG. 15 is a cross sectional view showing the structure of a fourth modification of the magnetic multilayered structure shown in FIG. 11.

FIGS. 14 and 15 illustrate the third modification and the fourth modification, respectively. The third modification shown in FIG. 14 has the upper Co-base magnetic crystalline layer 25b, and the lower Co-base magnetic crystalline layer 25a is deleted from the third modification. On the other hand, the fourth modification shown in FIG. 15 has the lower Co-base magnetic crystalline layer 25a, and the upper Co-base magnetic crystalline layer 25b is deleted from the fourth modification. Even if one of the lower/upper Co-base magnetic crystalline layers 25a/25b is deleted from the multilayered magnetic structure, the remaining Co-base magnetic crystalline layer 25b/25a enlarges the magneto-resistance ratio.

Both of or one of the lower/upper Co-base magnetic crystalline layers 25a/25b may be inserted into the multi-layered magnetic structure shown in FIG. 12.

Process Sequence

Figure 16A:
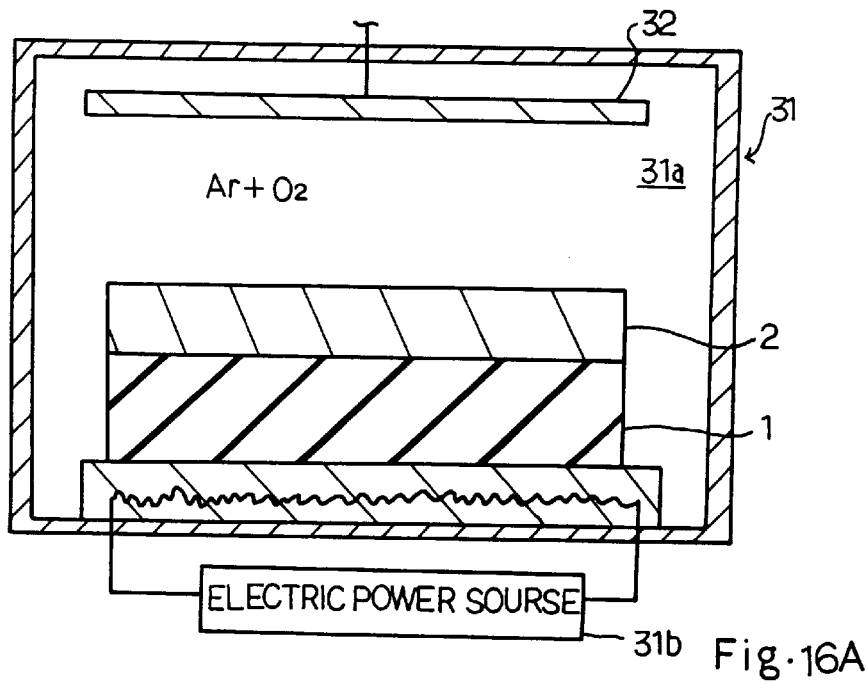
FIGS. 16A to 16D are cross sectional views showing a process sequence for fabricating the multilayered magnetic structure shown in FIG. 1.

FIGS. 16A to 16D illustrate a process sequence for fabricating the multilayered magnetic structure shown in FIG. 1. The process starts with preparation of the substrate 1, and is placed in the reaction chamber 31a of a reactive sputtering system 31. The major surface of the substrate 1 is opposed to a target 32 of antiferromagnetic material. A heater 31b heats the substrate 1 to 300 degrees in centigrade, and gaseous mixture of argon and oxygen is maintained at 20 mili-torr in the reaction chamber 31a. The target 32 is sputtered at 20 watts, and the antiferromagnetic material is deposited to 40 nanometers thick on the major surface of the substrate 1 as shown in FIG. 16A.

The substrate 1 is placed in the chamber 33a of a dc sputtering system 33, and the antiferromagnetic layer 2 is opposed to a composite target 34. The composite target 34 is implemented by an Fe plate 34a and chips 34b of at least one transition metal and element "X" attached to the Fe plate 34a. The substrate 1 is cooled at −50 degrees in centigrade or less by means of coolant 33b, and magnetic field is created in the direction AR1 in parallel to the major surface of the substrate 1. Sputtering gas mainly composed of argon is introduced into the chamber 33a, and the composite target 34 is sputtered in the above conditions. Fe-base alloy is deposited to 3.5 nanometers thick on the antiferromagnetic layer 2, and the antiferromagnetic layer 2 is overlain by the lower Fe-base soft magnetic crystalline layer 3. The low-temperature sputtering results in the mean average diameter equal to or less than 30 nanometers.

The composite target 34 is replaced with a composite target 35. The composite target 35 is implemented by a copper plate 35a and chips of silver and element "Me", and is sputtered at −50 degrees in centigrade or less so as to form the non-magnetic spacer layer 3 of 3.0 nanometers thick. The low-temperature sputtering results in the mean grain size equal to or less than 30 nanometers. A copper target or a silver target may be used for the non-magnetic spacer layer 4.

Figure 16B:
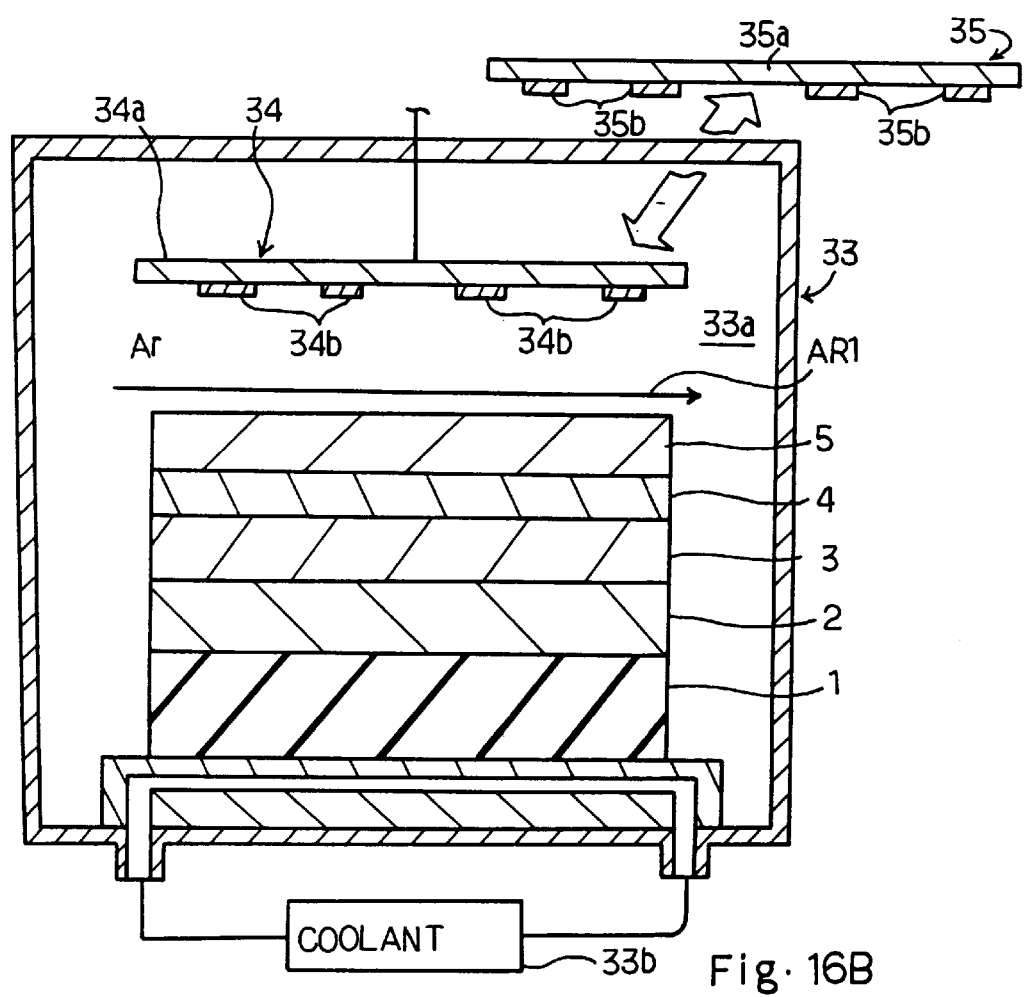

The composite target 35 is replaced with the composite target 34, again, and the composite target 34 is sputtered at −50 degrees in centigrade or less under application of the magnetic field AR1. The low-temperature sputtering results in the mean grain size equal to or less than 50 nanometers. The Fe-base alloy is deposited to 3.5 nanometers thick on the non-magnetic spacer layer 4, and forms the upper Fe-base soft magnetic crystalline layer 5 as shown in FIG. 16B.

Figure 16C:
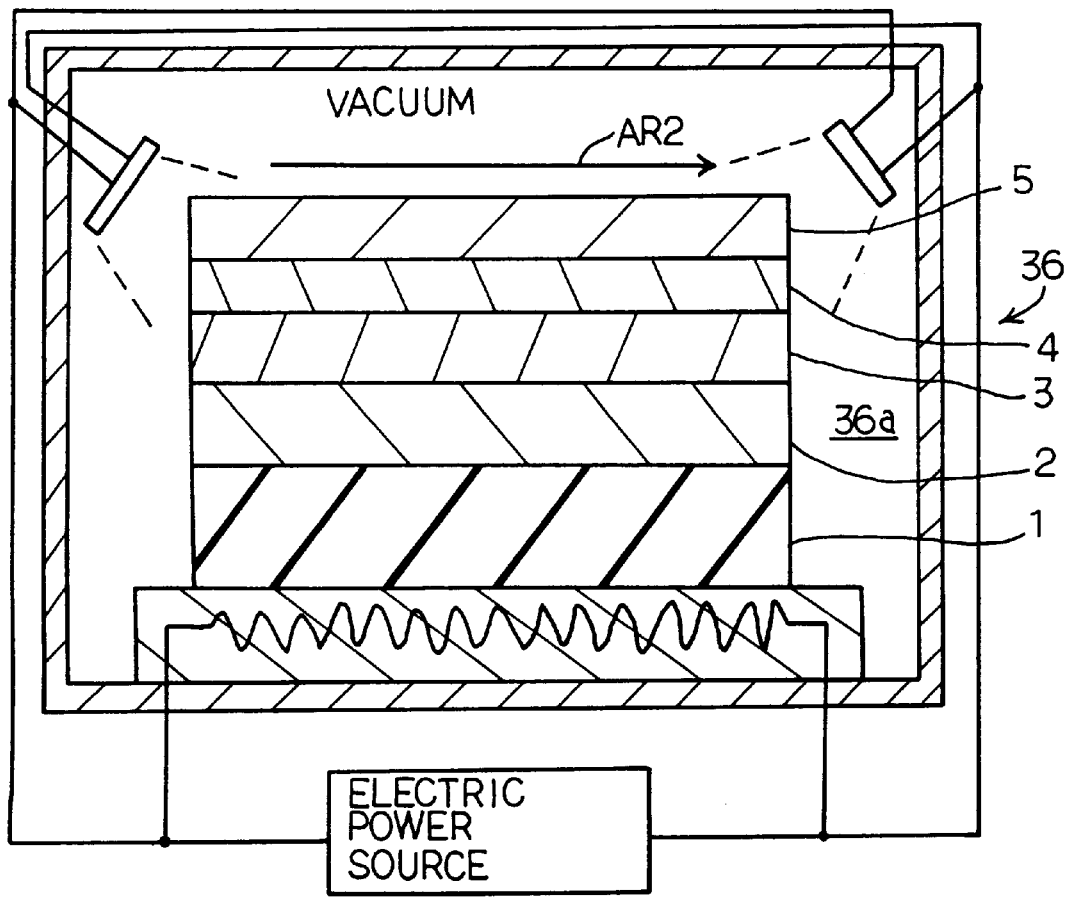
Figure 16D:
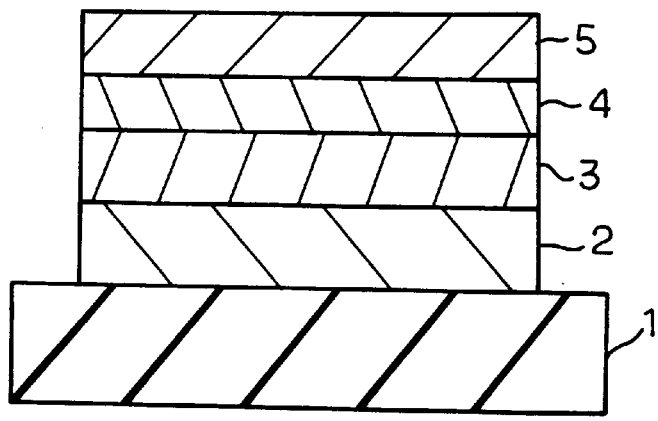

Subsequently, the multilayered magnetic structure is placed in a vacuum chamber 36a of a heating apparatus 36, and is treated with heat in vacuum. The heat treatment may be carried out under application of magnetic field AR2 in parallel to the major surface of the substrate 1 as shown in FIG. 16C. The magnetic field AR1 during the sputtering and the magnetic field AR2 during the heat treatment make the lower/upper Fe-base soft crystalline layers 3/5 uniaxially anisotropic, and the uniaxial anisotropy enhances the stabil-ity of the spin valve.

Figure 17A:
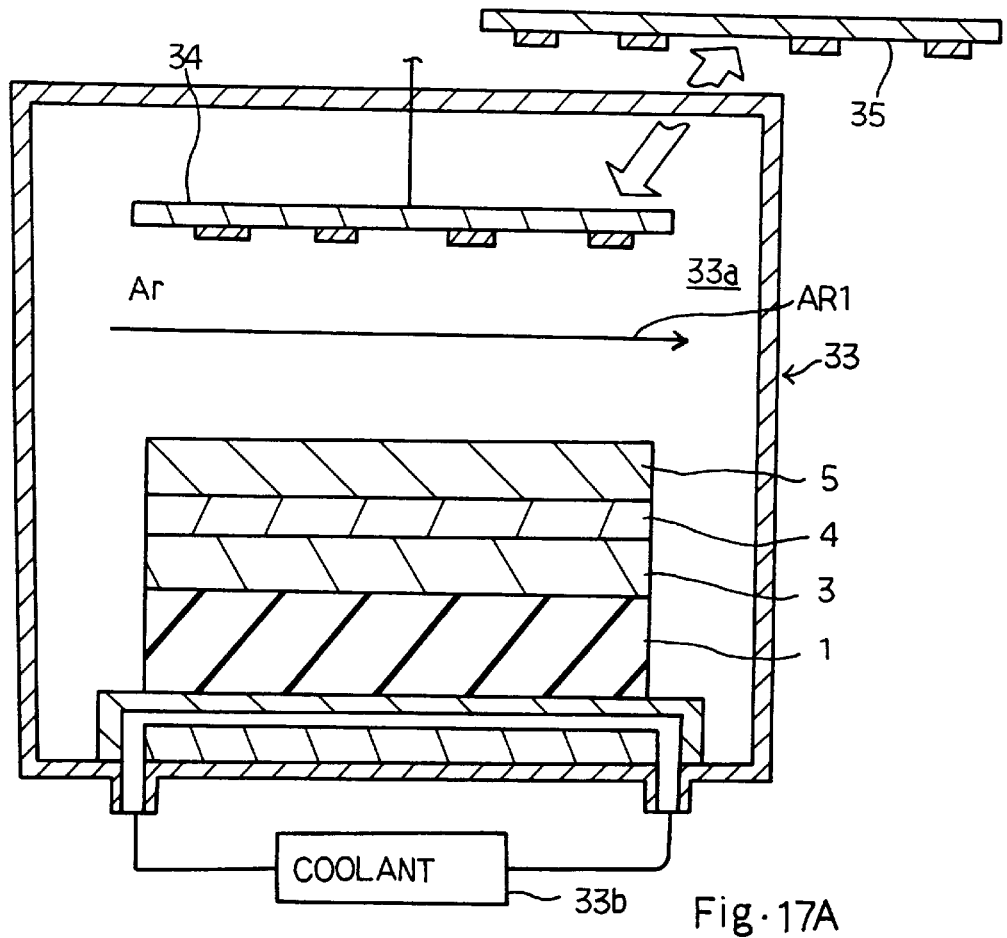
FIGS. 17A to 17D are cross sectional views showing a process sequence for fabricating the multilayered magnetic structure shown in FIG. 2.
Figure 17B:
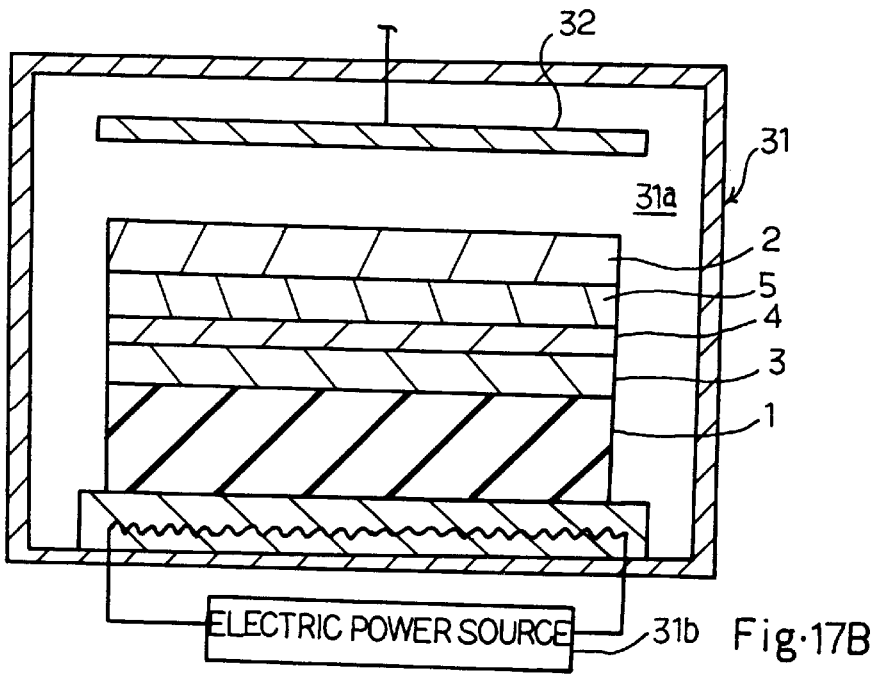
Figure 17C:
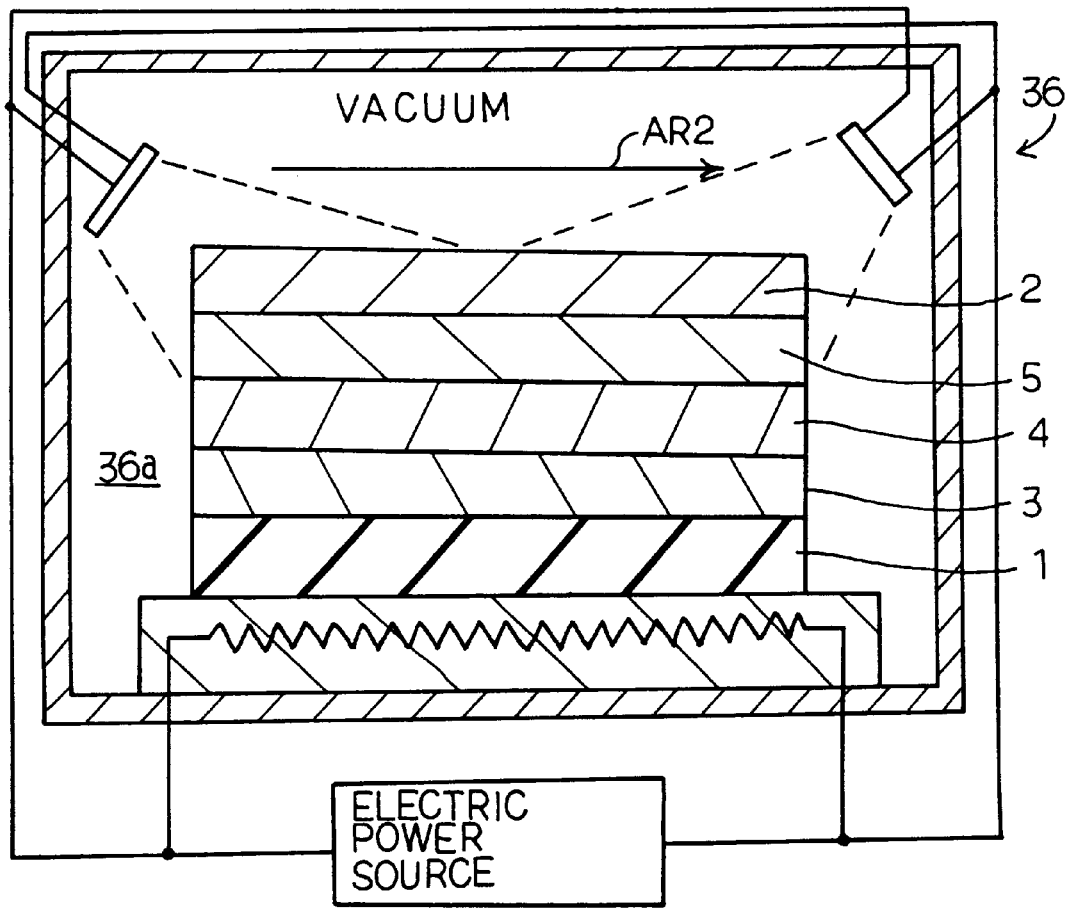
Figure 17D:
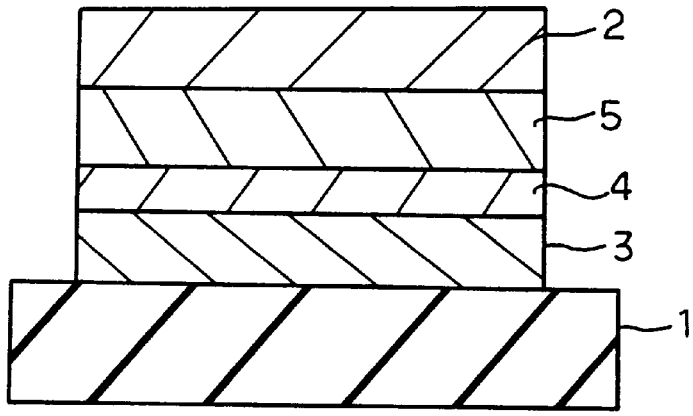

Finally, an appropriate mask (not shown) is formed on the multilayered magnetic structure shown in FIG. 17C, and the multilayered magnetic structure is patterned into a spin valve by using the ion-milling as shown in FIG. 17D.

The multilayered magnetic structure shown in FIG. 2 is formed through another process sequence shown in FIGS. 17A to 17D. The substrate 1 is placed in the chamber 33a of the dc sputtering system 33, and the composite target 34 is sputtered under the low-temperature conditions in the presence of the magnetic field AR1 so as to deposit the lower Fe-base soft magnetic crystalline layer 3.

The composite target 34 is replaced with the composite target 35, and the composite target 35 is sputtered under the low temperature condition so as to form the non-magnetic spacer layer 4. A copper target or a silver target may be used for the non-magnetic spacer layer 4.

The composite target 35 is replaced with the composite target 34, again, and the composite target 34 is sputtered under the low-temperature condition in the presence of the magnetic field AR1 so as to form the upper Fe-base soft magnetic crystalline layer 5 as shown in FIG. 17A.

Subsequently, the substrate 1 is placed in the reaction chamber 31a of the reactive sputtering system 31, and the target 32 is sputtered in the gaseous mixture of argon and oxygen so as to deposit the antiferromagnetic layer 2 on the upper Fe-base soft magnetic crystalline layer 5 as shown in FIG. 17B.

The resultant multilayered magnetic structure is placed in the vacuum chamber 36a of the heating apparatus 36, and is treated with heat. The heat treatment ma be carried out under application of the magnetic field AR2 as shown in FIG. 17C.

Finally, an appropriate mask (not shown) is formed on the multilayered magnetic structure shown in FIG. 17C, and the multilayered magnetic structure is patterned into a spin valve by using the ion-milling as shown in FIG. 17D.

The multilayered magnetic structure shown in FIG. 3 is fabricated as follows. FIGS. 18A to 18D illustrate a process sequence for fabricating the multilayered magnetic structure shown in FIG. 3.

Figure 18A:
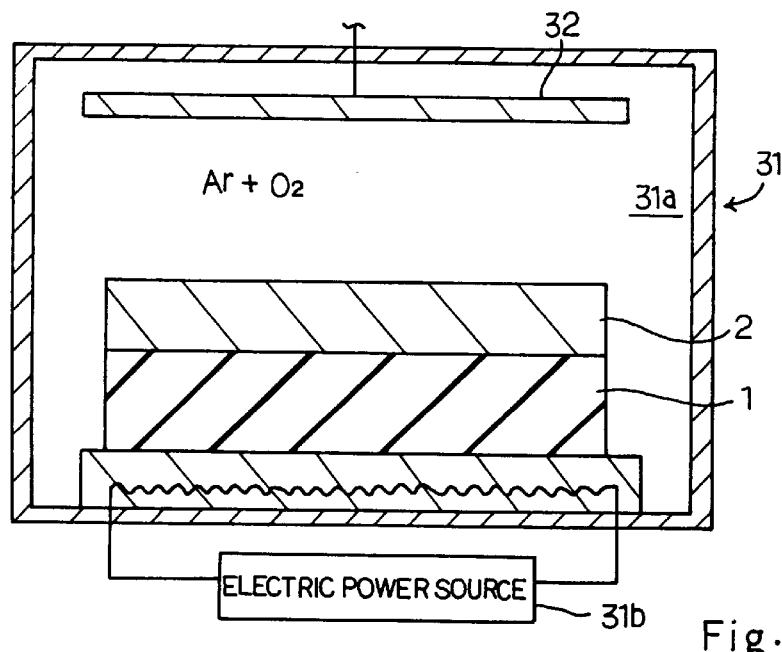
FIGS. 18A to 18D are cross sectional view showing a process sequence for fabricating the multilayered magnetic structure shown in FIG. 3.

The process starts with preparation of the substrate 1, and is placed in the reaction chamber 31a of the reactive sputtering system 31. The major surface of the substrate 1 is opposed to the target 32, and the heater 31b heats the substrate 1 to 300 degrees in centigrade, and gaseous mixture of argon and oxygen is maintained at 20 mili-torr in the reaction chamber 31a. The target 32 is sputtered at 20 watts, and the antiferromagnetic material is deposited to 40 nanometers thick on the major surface of the substrate 1 as shown in FIG. 18A.

Subsequently, the substrate 1 is placed in the chamber 33a of the dc sputtering system 33, and the antiferromagnetic layer 2 is opposed to the composite target 34. The substrate 1 is cooled at −50 degrees in centigrade or less by means of coolant 33b, and magnetic field AR1 is created. The composite target 34 is sputtered in the argon ambience, and Fe-base alloy is deposited to 3.5 nanometers thick on the antiferromagnetic layer 2 so as to form the lower Fe-base soft magnetic crystalline layer 3. The low-temperature sputtering results in the mean average diameter equal to or less than 30 nanometers.

The composite target 34 is replaced with a composite target 37. The composite target 37 is implemented by a cobalt plate 37a and chips of element "M" and element "B". The composite target 37 is sputtered in the low-temperature condition in the presence of the magnetic field AR1, and the Co-base alloy is deposited to 0.1 nanometer to 1.0 nanometer thick so as to form the lower Co-base magnetic crystalline layer 6 on the lower Fe-base soft magnetic crystalline layer 3. The mean grain size of the lower Co-base magnetic crystalline layer 6 is equal to or less than 30 nanometers.

The composite target 37 is replaced with the composite target 35. The composite target 35 is sputtered at −50 degrees in centigrade or less so as to form the non-magnetic spacer layer 3 of 3.0 nanometers thick. The low-temperature sputtering results in the mean grain size equal to or less than 30 nanometers. A copper target or a silver target may be used for the non-magnetic spacer layer 4.

The composite target 35 is replaced with the composite target 37, again, and is sputtered in the low-temperature condition in the presence of the magnetic field AR1. Then, the Co-base alloy is deposited to 0.1 nanometer to 1.0 nanometer thick so as to form the upper Co-base magnetic crystalline layer 7 on the non-magnetic spacer layer 4. The mean grain size of the upper Co-base magnetic crystalline layer 7 is equal to or less than 30 nanometers. Thus, the upper Co-base magnetic crystalline layer 7 is formed on the non-magnetic spacer layer 4.

Figure 18B:
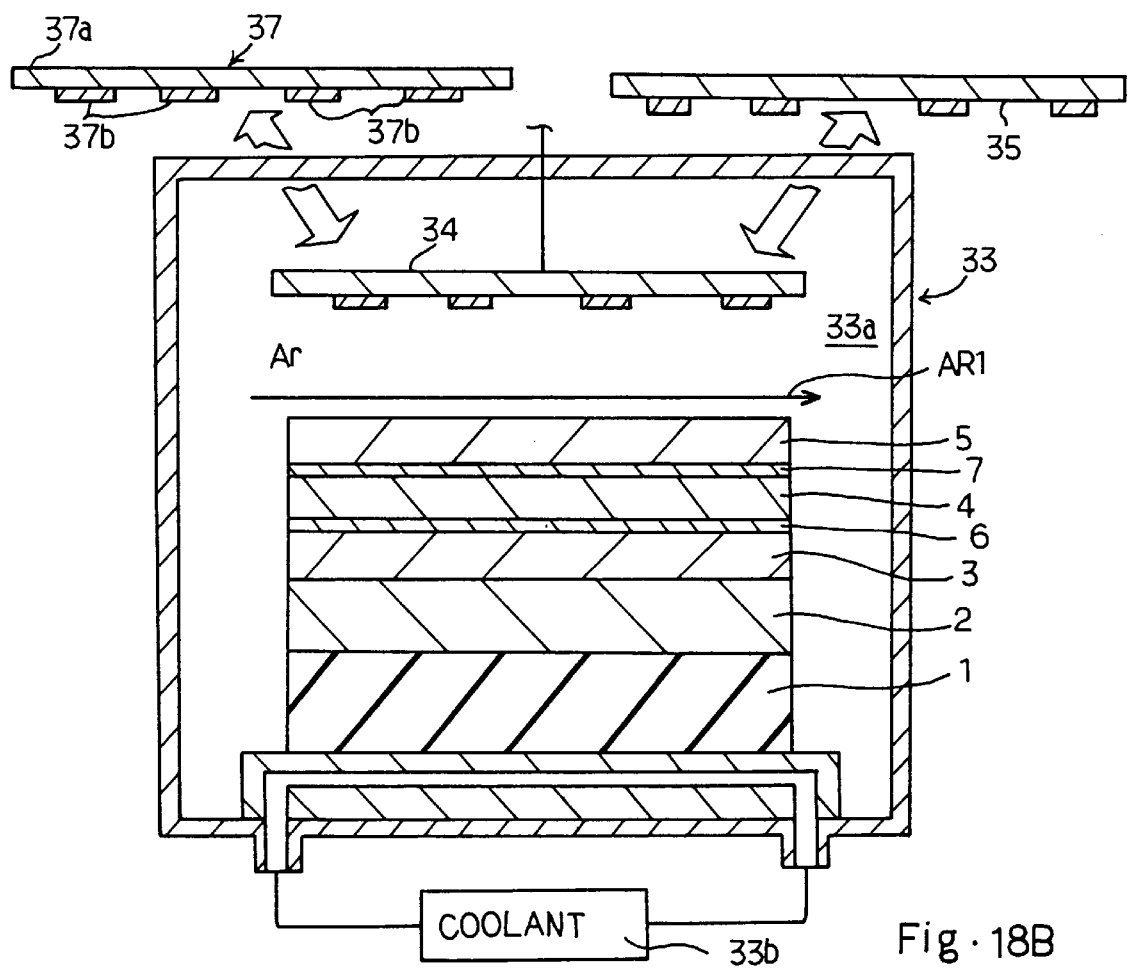

The composite target 37 is replaced with the composite target 34, again, and the composite target 34 is sputtered in the low-temperature condition under the application of the magnetic field AR1. The low-temperature sputtering results in the mean grain size equal to or less than 30 nanometers. The Fe-base alloy is deposited to 3.5 nanometers thick on the non-magnetic spacer layer 4, and forms the upper Fe-base soft magnetic crystalline layer 5 as shown in FIG. 18B.

Figure 18C:
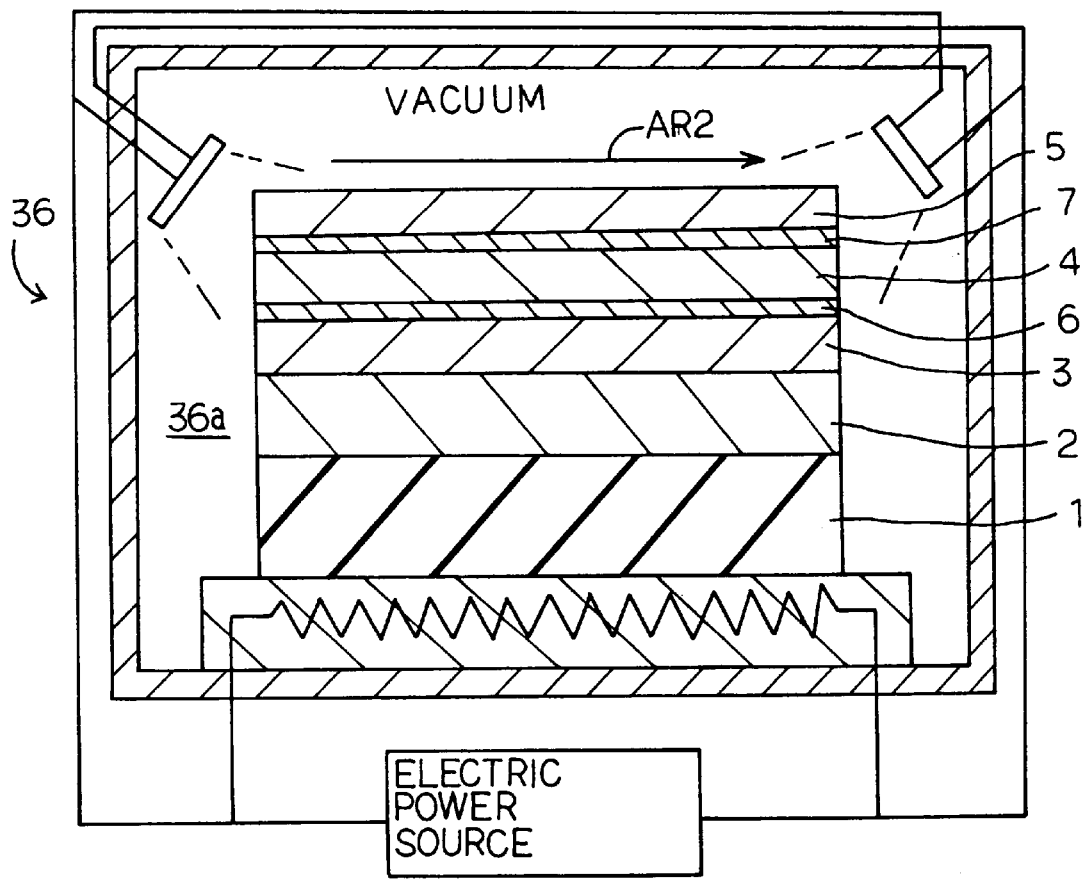

Subsequently, the multilayered magnetic structure is placed in the vacuum chamber 36a of the heating apparatus 36, and is treated with heat in vacuum. The heat treatment may be carried out under application of the magnetic field AR2 as shown in FIG. 18C. The magnetic field AR1 during the sputtering and the magnetic field AR2 during the heat treatment make the lower/upper Fe-base soft crystalline layers 3/5 and the lower/upper Co-base magnetic crystalline layers 6/7 uniaxially anisotropic, and the uniaxial anisotropy enhances the stability of the spin valve.

Figure 18D:
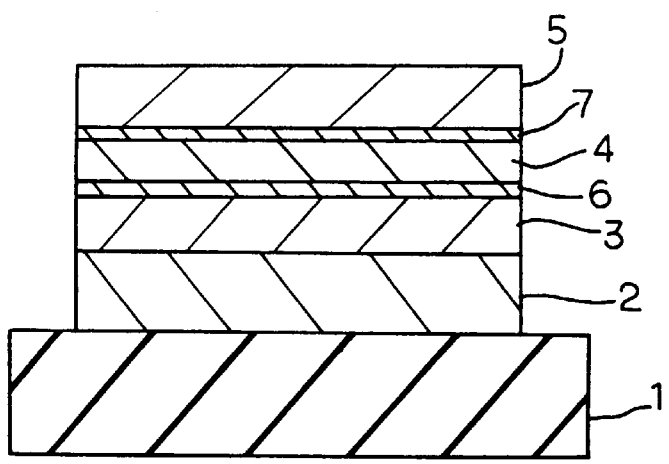

Finally, an appropriate mask (not shown) is formed on the multilayered magnetic structure shown in FIG. 18C, and the multilayered magnetic structure is patterned into a spin valve by using the ion-milling as shown in FIG. 18D.

The process sequences for the second and third embodiments and the modifications thereof are similar to the above described processes. Although the Fe-base soft magnetic crystalline layer of the second embodiment is shaped into a trapezoid, such a trapezoidal configuration is realized by using the lithography and the ion-milling. The trapezoidal Fe-base soft magnetic crystalline layers allows the magnetic blocks to be magnetically perfectly held in contact therewith.

Evaluation for First Embodiment

The present inventor fabricated samples of the multilayered magnetic structures implementing the first embodiment. The present inventor firstly prepared the substrates 1, and the substrates 1 were placed in the reaction chamber 31a of the reactive sputtering system 31 together with a NiO sintered target. The substrates 1 were heated to 300 degrees in centigrade, and the gaseous mixture of argon and oxygen was introduced into the reaction chamber 31a. The gaseous mixture was maintained at 20 mili-torr, and the NiO sintered target was sputtered at 20 watts. The antiferromagnetic layers 2 of NiO were deposited to 40 nanometers thick on the substrates 1, respectively.

Subsequently, the lower Fe-base soft magnetic crystalline layer 3, the non-magnetic spacer layer 4 and the upper Fe-base soft magnetic crystalline layer 5 were successively deposited to 3.5 nanometers thick, 3.0 nanometers thick and 3.5 nanometers thick over each of the antiferromagnetic layers 2.

The dc sputtering system 33 was used for the deposition. The substrates 1 were changed between −200 degrees to +300 degrees in centigrade, and magnetic field of zero to 250 oersted was applied in parallel to the major surfaces of the substrates 1 during the dc sputtering. The dc sputtering was carried out in the ambience mainly composed of argon gas. However, when an Fe-base nitride was deposited, nitrogen was mixed with the argon gas, and the Fe-base nitride was deposited by using a reactive sputtering technique.

In order to obtain the mean grain size equal to or less than 30 nanometers, the deposition should be carried out at −50 degrees in centigrade or less.

The composite targets 34/35/37 were sputtered in the dc sputtering system 33. The non-magnetic spacer layer 3 was alternatively deposited by using a copper target or a silver target. In case of insertion of the Co-base magnetic crystalline layer or layers 6/7, the composite target 37 was used.

Upon completion of the samples of the multilayered magnetic structures, the samples were treated with heat in vacuum under application of the magnetic field AR2 ranging from zero to 1 kilo-oersted in the direction parallel to the major surfaces of the substrates 1.

Thus, the magnetic field was created in parallel to the major surfaces of the substrates 1 during the deposition and the heat-treatment, and imparted a uniaxial anisotropy to the magnetic layers. The uniaxial anisotropy caused the spin valve to stably operate.

The present inventor observed the samples of the spin valve type multilayered magnetic structure through a transmission electron microscope, and measured the magneto-resistance and the orientation of magnetization. The magneto-resistance was measured through a four-probe method, and the samples had been patterned into a four-probe resistance pattern by using a lithography and an ion-milling.

The present inventor formed Fe-base alloy layers expressed as Fe-M-X of the afore-mentioned combinations between "M" and "X", Cu-Ag-Me alloy layers of the afore-mentioned combinations between Cu, Ag and "Me" and Co-base alloy layers expressed as Co-M-B of the afore-mentioned combinations between Co, B and "M". The present inventor evaluated the crystal structure and magnetic properties of the Fe-base alloy layers, the Cu-Ag-Me alloy layers and the Co-base alloy layers. However, the crystal structure and the magnetic properties were not dependent on the composition of the alloy layers. For this reason, description is hereinbelow focused on the Fe-M-X alloy layers where M was Sc, Hf and Ta and X was C and B, the Cu-Ag-Me alloy layers where Me was Si and the Co-M-B alloy layers where M was Zr.

Fe-M-X Alloy

The first samples were formed of Fe-Ta-C alloy. Fe was 78 atomic percent, Ta was 11 atomic percent and C was 11 atomic percent. The Fe-Ta-C alloy layers were grown on substrates at different substrate temperatures (see Table 1), and the heat treatment after the sputtering was carried out at 550 degrees in centigrade for an hour.

The present inventor changed the temperature between 350 degrees and 750 degrees in centigrade and the time period between 15 minutes and 3 hours. However, the result was not changed.

The present inventor observed the Fe-Ta-C alloy layers by using a the transmission electron microscope, and determined the grain size. The Fe-Ta-C alloy layers grown at −50 degrees in centigrade or less were amorphous, and the substrate temperature at zero degrees in centigrade caused the Fe-Ta-C alloy to be crystalline. The grain size was enlarged together with the substrate temperature. The amorphous Fe-Ta-C alloy did not exceed the mean grain size of 30 nanometers after the heat treatment.

The present inventor concluded that the amorphous Fe-Ta-C alloy grown at −50 degrees in centigrade or less did not form large grains or particles, and the mean grain size was restricted to be equal to or less than 30 nanometers.

TABLE 1

| Sub. Temp. (° C.) | Grain after growth (nm) | Grain after heat treat. (nm) |
| --- | --- | --- |
| −200 | amorphous | 20 |
| −100 | amorphous | 25 |
| −50 | amorphous | 30 |
| 0 | 10 | 80 |
| 50 | 50 | 190 |
| 100 | 80 | 230 |
| 300 | 120 | 360 |

The present inventor further evaluated Fe-Ta-C alloy layers grown at 31 50 degrees in centigrade, and the Fe-Ta-C alloy layers were annealed at 600 degrees in centigrade for 30 minutes under application of the magnetic field of 5000 oersted. After the heat treatment, the present inventor confirmed the mean average diameter to be 30 nanometers.

Figure 19:
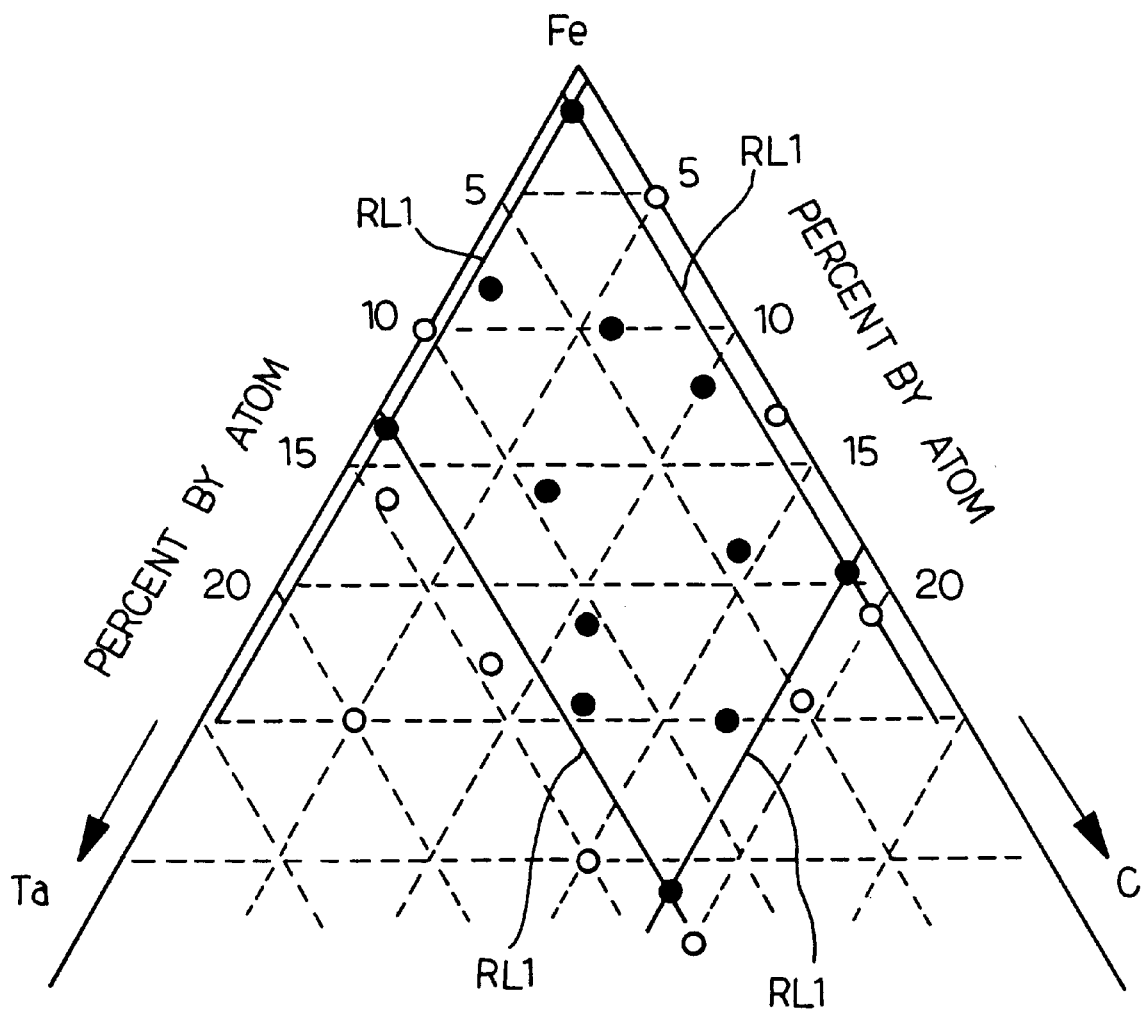
FIG. 19 is a graph showing the relation between the composition of Fe-Ta-C alloy, the saturation magnetic flux density and the magnetic permeability.

The present inventor measured the saturation magnetic flux density and the magnetic permeability of the Fe-Ta-C alloy layers treated with heat as described above, and plotted the saturation magnetic flux density and the magnetic permeability in terms of the composition of the Fe-Ta-C alloy layers in FIG. 19. Dots represented the Fe-Ta-C alloy layers having the saturation magnetic flux density equal to or greater than 1.2 teslas and the magnetic permeability equal to or greater than 1000, and the Fe-Ta-C alloy layers represented by open circles were less than 1.2 teslas or less than 1000 in the magnetic permeability.

The present inventor encompassed the Fe-Ta-C alloy layers with the large saturation magnetic flux density and the large magnetic permeability with solid lines RL1, and determined a soft magnetic region with the large saturation magnetic flux density to have Ta ranging between 2 percent to 13 percent by atom and C ranging between 0.5 percent and 18 percent by atom.

The second samples were Fe-Hf-C alloy layers. The Fe-Hf-C alloy layers were grown at −150 degrees in centigrade, and were, thereafter, treated with heat at 500 degrees in centigrade in vacuum for 30 minutes under the magnetic field AR2 of 5000 oersted. The present inventor confirmed the mean grain size to be 20 nanometers.

Figure 20:
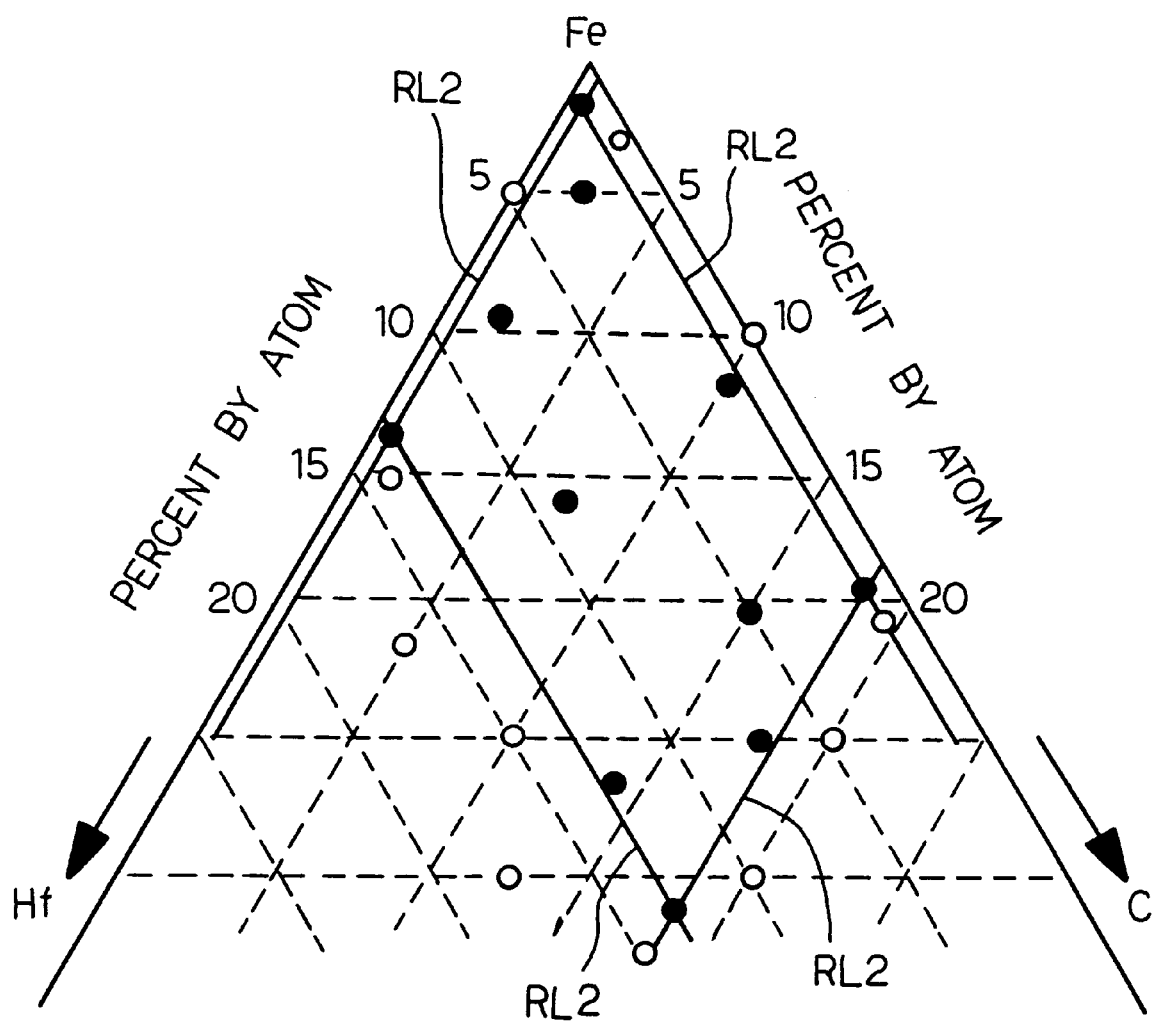
FIG. 20 is a graph showing the relation between the composition of Fe-Hf-C alloy, the saturation magnetic flux density and the magnetic permeability.

The present inventor measured the saturation magnetic flux density and the magnetic permeability of the Fe-Hf-C alloy layers, and plotted the saturation magnetic flux density and the magnetic permeability in terms of the composition of the Fe-Hf-C alloy layers as shown in FIG. 20.

Dots represented the Fe-Hf-C alloy layers having the saturation magnetic flux density equal to or greater than 1.2 teslas and the magnetic permeability equal to or greater than 1000, and the Fe-Hf-C alloy layers represented by open circles were less than 1.2 teslas or less than 1000 in the magnetic permeability.

The present inventor encompassed the Fe-Hf-C alloy layers with the large saturation magnetic flux density and the large magnetic permeability with solid lines RL2, and determined a soft magnetic region with the large saturation magnetic flux density to have Hf ranging between 2 percent to 13 percent by atom and C ranging between 0.5 percent and 18 percent by atom.

The third samples were Fe-Sc-B alloy layers. The Fe-Sc-B alloy layers were grown at −150 degrees in centigrade, and were, thereafter, annealed at 400 degrees in centigrade in vacuum for an hour under the magnetic field AR2 of 5000 oersted. The present inventor confirmed the mean grain size to be 5 nanometers.

Figure 21:
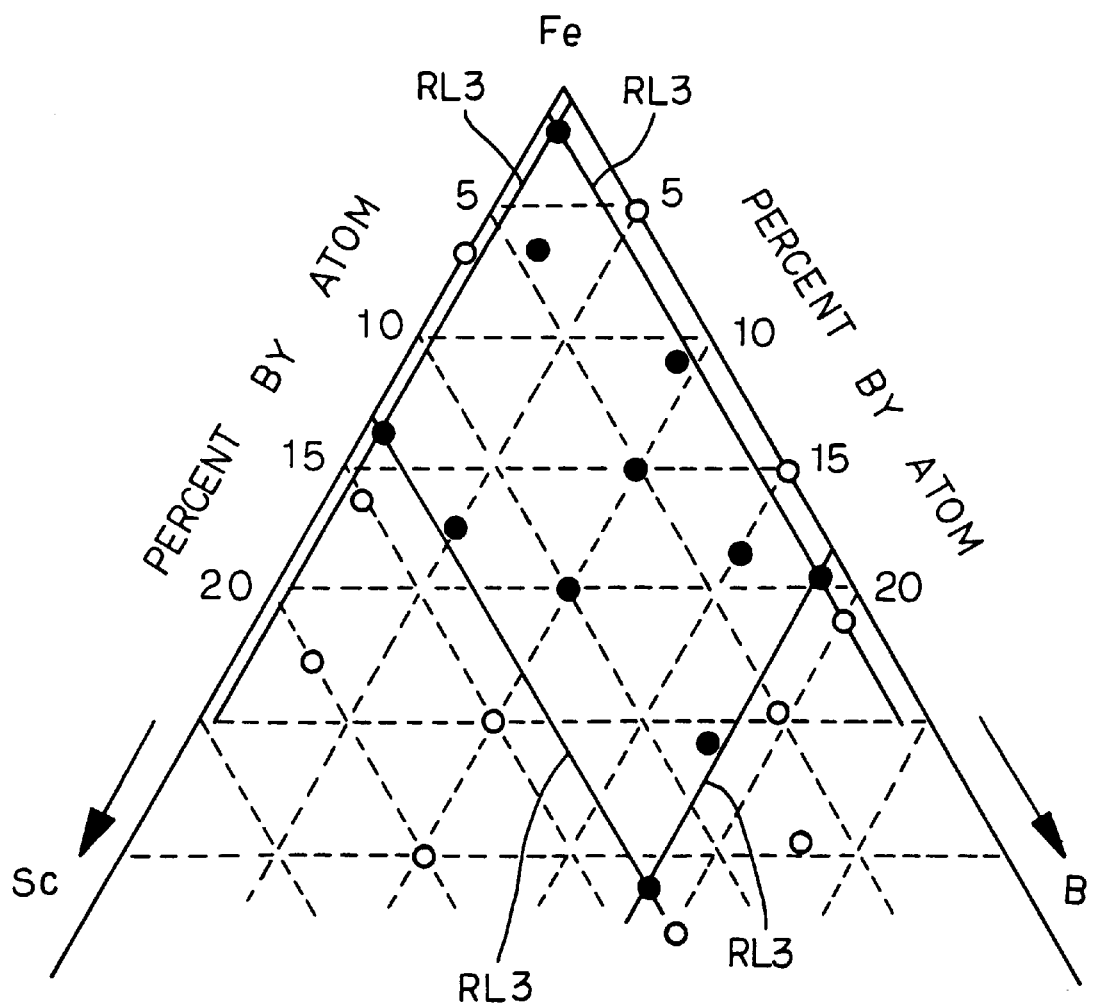
FIG. 21 is a graph showing the relation between the composition of Fe-Sc-B alloy, the saturation magnetic flux density and the magnetic permeability.

The present inventor measured the saturation magnetic flux density and the magnetic permeability of the third samples, and plotted the saturation magnetic flux density and the magnetic permeability in terms of the composition of the Fe-Sc-B alloy layers as shown in FIG. 21.

Dots represented the third samples having the saturation magnetic flux density equal to or greater than 1.2 teslas and the magnetic permeability equal to or greater than 1000, and the third samples represented by open circles were less than 1.2 teslas or less than 1000 in the magnetic permeability.

The present inventor encompassed the third samples with the large saturation magnetic flux density and the large magnetic permeability with real lines RL3, and determined a soft magnetic region with the large saturation magnetic flux density to have Sc ranging between 2 percent to 13 percent by atom and B ranging between 0.5 percent and 18 percent by atom.

Cu-Ag-Me Alloy

The present inventor observed Cu-Ag-Si alloy layers through the transmission electron microscope, and the Cu-Ag-Si alloy layers were 30 nanometers thick. The first samples contained Ag at 15 percent to 90 percent by atom and Si at 5 percent to 40 percent by atom. The substrate temperature was equal to −50 degrees in centigrade or less, and the low-temperature growth resulted in amorphous. However, when the composition of Cu-Ag-Si alloy was out of the above described range, the Cu-Ag-Si alloy was crystallized through the low-temperature growth. In case where the growing temperature was higher than −50 degrees in centigrade, the Cu-Ag-Si alloy of the above described composition was crystallized. After the low-temperature growth, the Cu-Ag-Si alloy was treated with heat at 600 degrees in centigrade for an hour without magnetic field, and was crystallized. The mean grain size was 30 nanometers. The gain size of the Cu-Ag-Si alloy crystallized during the growth was enlarged in the heat treatment.

The present inventor concluded that the Cu-Ag-Si alloy available for the non-magnetic spacer layer had Ag between 15 percent to 90 percent by atom and Si between 5 percent to 40 percent by atom and was grown at −50 degrees in centigrade or less.

Samples of First Embodiment

The present inventor fabricated samples of the first embodiment. The Fe-base soft magnetic crystalline layers 3/5 were formed of Fe-Ta-C alloy, and Fe content, Ta content and C content were 78 percent by atom, 11 percent by atom and 11 percent by atom, respectively. The Fe-base soft magnetic crystalline layers 3/5 were 1.48 teslas in saturation magnetic flux density, and were regulated to 3.5 nanometers thick.

The non-magnetic spacer layer 4 was formed of Cu, Ag or Cu-Ag-Si alloy, and the Cu-Ag-Si alloy contained Cu at 75 percent by atom, Ag at 15 percent by atom and Si at 10 percent by atom. The non-magnetic spacer layer 4 was regulated to 3.0 nanometers thick. The Fe-base soft magnetic crystalline layers 3/5 and the non-magnetic spacer layer 4 were grown at different substrate temperature (see Table 2), and were treated with heat in vacuum at 550 degrees in centigrade for 40 minutes in magnetic field of 8000 oersted.

The antiferromagnetic layer 2 was attached to one of the Fe-base soft magnetic crystalline layers 3/5, and ranged from 30 nanometers to 40 nanometers thick. Thus, the samples of the spin valve type multilayered magnetic structure were fabricated by the present inventor, and the present inventor measured the magnetoresistance ratio as shown in Table 2.

The present inventor further fabricated samples of multilayered magnetic structure through the growing technique and the heat treatment described above, and measured the mean grain size of these sample. The sample had a NiO layer of 30 nanometers thick, the Fe-Ta-C alloy layer of 200 nanometers thick, Cu, Ag or the Cu-Ag-Si alloy layer of 100 nanometers thick and the Fe-Ta-C alloy layer of 200 nanometers thick. The mean grain size of these layers was measured through the transmission electron microscope, and were written in Table 2.

When the non-magnetic spacer layer 4 was formed of Cu or Ag, each of the samples of the first embodiment achieved a magnetoresistance ratio more than 10 percent in so far as the Fe-base soft magnetic crystalline layers 3/5 had the mean grain size equal to or less than 30 nanometers. In case of the samples using the Cu-Ag-Si alloy, a large magnetoresistance ratio more than 10 percent was achieved only when both of the Fe-Ta-C alloy and the Cu-Ag-Si alloy had the mean grain size equal to or less than 30 nanometers.

The present inventor further evaluated comparative samples which had Fe-Ta-C alloy layers less than 1.2 teslas. These comparative samples did not achieve a large magnetoresistance ratio more than 10 percent even if the mean grain size was equal to or less than 30 nanometers.

TABLE 2

| Space layer | Substrate temp. (° C.) | Grain Size of Fe—Ta—C (nm) | Grain Size of Spacer (nm) | MR ratio (%) |
| --- | --- | --- | --- | --- |
| Cu | −200 | 20 | 100 | 18 |
| | −100 | 25 | 120 | 15.3 |
| | −50 | 30 | 110 | 12.2 |
| | 0 | 80 | 120 | 5.1 |
| | 50 | 190 | 200 | 3.0 |
| | 100 | 230 | 230 | 2.5 |
| | 300 | 360 | 360 | 2.0 |
| Ag | −200 | 20 | 130 | 17 |
| | −100 | 25 | 150 | 15.5 |
| | −50 | 30 | 150 | 12.2 |
| | 0 | 80 | 150 | 4.3 |
| | 50 | 190 | 150 | 2.1 |
| | 100 | 230 | 200 | 1.2 |
| | 300 | 360 | 300 | 0.5 |
| Cu—Ag—Si | −200 | 20 | 20 | 19.8 |
| | −100 | 25 | 25 | 18.3 |
| | −50 | 30 | 30 | 15.4 |
| | 0 | 80 | 80 | 5.0 |
| | 50 | 190 | 200 | 4.2 |
| | 100 | 230 | 250 | 2.3 |
| | 300 | 360 | 350 | 0.8 |

The present inventor changed the Fe-base soft magnetic crystalline layers 3/5 from Fe-Ta-C alloy to Fe-Hf-C alloy. The Fe-Hf-C alloy contained Fe at 84 percent by atom, Hf at 9 percent by atom and C at 7 percent by atom, and the saturation magnetic flux density thereof was 1.64 teslas. The non-magnetic spacer layers 4 were formed of Cu-Ag-Si alloy containing Cu at 45 percent by atom, Ag at 35 percent by atom and Si at 20 percent by atom. The growth of the Fe-base soft magnetic crystalline layers 3/5 and the non-magnetic spacer layer 4 was carried out at different substrate temperature. The antiferromagnetic layer 2 was formed of NiO, and was 30 nanometers thick. The heat treatment was carried out in vacuum at 550 degrees in centigrade for 40 minutes in magnetic field of 8000 oersted. The present inventor measured the magnetoresistance ratio of these samples of the spin valve type multilayered magnetic structure, and the result was written in Table 3.

The present inventor further fabricated samples of multilayered magnetic structure through the growing technique and the heat treatment described above, and measured the mean grain size of these sample. The sample had a NiO layer of 30 nanometers thick, the Fe-Hf-C alloy layer of 200 nanometers thick, Cu, Ag or the Cu-Ag-Si alloy layer of 100 nanometers thick and the Fe-Hf-C alloy layer of 200 nanometers thick. The mean grain size of these layers was measured using a transmission electron microscope, and were written in Table 3.

When the non-magnetic spacer layer 4 was formed of Cu or Ag, each of the samples of the first embodiment achieved a large magnetoresistance ratio more than 10 percent in so far as the Fe-base soft magnetic crystalline layers 3/5 of Fe-Hf-C alloy had the mean grain size equal to or less than 30 nanometers. In case of the samples using the Cu-Ag-Si alloy, a large magnetoresistance ratio more than 10 percent was achieved only when both of the Fe-Hf-C alloy and the Cu-Ag-Si alloy had the mean grain size equal to or less than 30 nanometers.

The present inventor further evaluated samples of the first embodiment which had Fe-Hf-C alloy layers less than 1.2 teslas. These samples did not achieve a large magnetoresistance ratio more than 10 percent even if the mean grain size was equal to or less than 30 nanometers.

TABLE 3

| Space layer | Substrate temp. (° C.) | Grain Size of Fe—Hf—C (nm) | Grain Size of Spacer (nm) | MR ratio (%) |
| --- | --- | --- | --- | --- |
| Cu | −200 | 20 | 100 | 16.6 |
|  | −100 | 25 | 120 | 13.1 |
|  | −50 | 30 | 110 | 11.0 |
|  | 0 | 80 | 120 | 4.3 |
|  | 50 | 190 | 200 | 2.5 |
|  | 100 | 230 | 230 | 2.5 |
|  | 300 | 360 | 360 | 2.0 |
| Ag | −200 | 20 | 130 | 17.5 |
|  | −100 | 25 | 150 | 16.1 |
|  | −50 | 30 | 150 | 12.0 |
|  | 0 | 80 | 150 | 4.1 |
|  | 50 | 190 | 150 | 2.5 |
|  | 100 | 230 | 200 | 1.8 |
|  | 300 | 360 | 300 | 0.5 |
| Cu—Ag—Si | −200 | 20 | 20 | 21.3 |
|  | −100 | 25 | 25 | 19.3 |
|  | −50 | 30 | 30 | 14.4 |
|  | 0 | 80 | 80 | 4.1 |
|  | 50 | 190 | 200 | 3.2 |
|  | 100 | 230 | 250 | 2.3 |
|  | 300 | 360 | 350 | 0.6 |

The present inventor changed the Fe-base soft magnetic crystalline layers 3/5 from Fe-Hf-C alloy to Fe-Sc-B alloy. The Fe-Sc-B alloy contained Fe at 82 percent by atom, Sc at 15 percent by atom and C at 10 percent by atom, and the saturation magnetic flux density thereof was 1.88 teslas. The non-magnetic spacer layers 4 were formed of Cu-Ag-Si alloy containing Cu at 75 percent by atom, Ag at 15 percent by atom and Si at 10 percent by atom. The antiferromagnetic layer 2 was formed of NiO, and was 30 nanometers thick. The growth of the Fe-base soft magnetic crystalline layers 3/5 and the non-magnetic spacer layer 4 was carried out at different substrate temperature. The heat treatment was carried out in vacuum at 550 degrees in centigrade for 40 minutes in magnetic field of 8000 oersted. The present inventor measured the magnetoresistance ratio of these samples of the spin valve type multilayered magnetic structure, and the result was written in Table 4.

The present inventor further fabricated samples of multilayered magnetic structure through the growing conditions and the heat treatment described above, and measured the mean grain size of these sample. The sample had a NiO layer of 30 nanometers thick, the Fe-Sc-B alloy layer of 200 nanometers thick, Cu, Ag or the Cu-Ag-Si alloy layer of 100 nanometers thick and the Fe-Sc-B alloy layer of 200 nanometers thick. The mean grain size of these layers was measured by using a transmission electron microscope, and were written in Table 4.

When the non-magnetic spacer layer 4 was formed of Cu or Ag, each of the samples of the first embodiment achieved a large magnetoresistance ratio more than 10 percent in so far as the Fe-base soft magnetic crystalline layers 3/5 of Fe-Sc-B alloy had the mean grain size equal to or less than 30 nanometers. In case of the samples using the Cu-Ag-Si alloy, a large magnetoresistance ratio more than 10 percent was achieved only when both of the Fe-Sc-B alloy and the Cu-Ag-Si alloy had the mean grain size equal to or less than 30 nanometers.

The present inventor further evaluated samples of the first embodiment which had Fe-Sc-B alloy layers less than 1.2 teslas. These samples did not achieve a large magnetoresistance ratio more than 10 percent even if the mean grain size was equal to or less than 30 nanometers.

TABLE 4

| Spacer layer | Substrate temp. (° C.) | Grain Size of Fe—Hf—C (nm) | Grain Size of Spacer (nm) | MR ratio (%) |
| --- | --- | --- | --- | --- |
| Cu | −200 | 20 | 100 | 21.3 |
|  | −100 | 25 | 120 | 19.7 |
|  | −50 | 30 | 110 | 15.2 |
|  | 0 | 80 | 120 | 5.8 |
|  | 50 | 190 | 200 | 3.3 |
|  | 100 | 230 | 230 | 2.4 |
|  | 300 | 360 | 360 | 2.0 |
| Ag | −200 | 20 | 130 | 20.5 |
|  | −100 | 25 | 150 | 18.4 |
|  | −50 | 30 | 150 | 15.2 |
|  | 0 | 80 | 150 | 5.3 |
|  | 50 | 190 | 160 | 4.1 |
|  | 100 | 230 | 200 | 3.2 |
|  | 300 | 360 | 300 | 1.5 |
| Cu—Ag—Si | −200 | 20 | 20 | 22.8 |
|  | −100 | 25 | 25 | 20.1 |
|  | −50 | 30 | 30 | 18.4 |
|  | 0 | 80 | 80 | 4.9 |
|  | 50 | 190 | 200 | 4.5 |
|  | 100 | 230 | 250 | 3.4 |
|  | 300 | 360 | 350 | 1.5 |

Co-Me-B Alloy

The present inventor evaluated the Co-base magnetic crystalline layer of Co-Zr-B alloy. The Co-Zr-B alloy layers were grown to 30 nanometers thick on substrates.

The Co-Zr-B alloy layers had Zr ranging between 2 percent and 13 percent by atom and B ranging between 5 percent and 25 percent by atom. When the substrate temperature was equal to or less than −50 degrees in centigrade, the Co-Zr-B alloy layers were amorphous. Other samples out of the above composition range were crystallized even if the substrate temperature was equal to or less than −50 degrees in centigrade. Even though other samples fell within the above composition range, the Co-Zr-B alloy was crystallized in the substrate temperature higher than −50 degrees in centigrade.

After the growth, the Co-Zr-B alloy layers were annealed in vacuum at 600 degrees in centigrade for an hour. The amorphous Co-Zr-B alloy was crystallized; however, the mean grain size was equal to or less than 30 nanometers. The grains of the crystalline Co-Zr-B alloy were enlarged during the heat treatment, and the mean grain size became greater than 30 nanometers.

The present inventor concludes that the Co-Zr-B alloy available for the Co-base magnetic crystalline layer had Zr ranging between 2 percent to 13 percent by atom and B ranging between 5 percent to 25 percent by atom and was grown at −50 degrees in centigrade or less.

Samples of Second to Fourth Modifications of First Embodiment

The present inventor fabricated samples of the second modification of the first embodiment shown in FIG. 3. The Fe-base soft magnetic crystalline layers 3/5 were formed of Fe-Ta-C alloy, and Fe content, Ta content and C content were 78 percent by atom, 11 percent by atom and 11 percent by atom, respectively. The Fe-base soft magnetic crystalline layers 3/5 were 1.48 teslas in saturation magnetic flux density. The Fe-base soft magnetic crystalline layers 3/5 were regulated to 3.5 nanometers thick.

The non-magnetic spacer layer 4 was formed of Cu, Ag or Cu-Ag-Si alloy, and the Cu-Ag-Si alloy contained Cu at 75 percent by atom, Ag at 15 percent by atom and Si at 10 percent by atom. The non-magnetic spacer layer 4 was regulated to 3.0 nanometers.

The Co-base magnetic crystalline layers 6/7 were formed of Co-Zr-B alloy which had Co at 82 percent by atom, Zr at 8 percent by atom and B at 10 percent by atom, respectively. The Co-Zr-B alloy layers were regulated to 0.5 nanometer thick.

The samples of the spin valve type multilayered magnetic structure were grown at different substrate temperatures. After the growth, the samples were annealed in vacuum at 550 degrees in centigrade for 40 minutes. The heat treatment was carried out in magnetic field of 5000 oersted for a first group of samples, and was carried out without magnetic field for a second group of samples. The change of magneto-resistance was measured, and the result was written in Table 5.

When the samples were grown at −50 degrees in centigrade or less, each of the samples of the spin valve achieved a large magnetoresistance ratio greater than 10 percent regardless of the material of the non-magnetic spacer 4. The samples anealed in the magnetic field achieved a large magnetoresistance ratio rather than the samples annealed without magnetic field.

The present inventor further evaluated comparative samples having Fe-Ta-C alloy layers less than 1.2 teslas in saturation magnetic flux density. The samples did not achieve a large magnetoresistance ratio greater than 10 percent.

The present inventor further fabricated samples of third and fourth modifications of the first embodiment, and evaluated them. The result was similar to that of the second modification.

The present inventor changed the thickness of the Co-Zr-B layers between 0.1 nanometer to 1.0 nanometer, and confirmed that the Co-Zr-B layers enlarged the magneto-resistance ratio of the spin valve rather than the multilayered magnetic structure shown in FIG. 1.

TABLE 5

| Spacer layer | Substrate temp. (° C.) | MR Ratio grown without magnetic field (%) | MR Ratio grown in magnetic field (%) |
|---|---|---|---|
| Cu | −200 | 18.9 | 20.0 |
|  | −100 | 16.1 | 17.8 |
|  | −50 | 13.2 | 14.5 |
|  | 0 | 5.3 | 5.5 |
|  | 50 | 3.2 | 3.9 |
|  | 100 | 2.7 | 3.2 |
|  | 300 | 2.3 | 2.9 |
| Ag | −200 | 18.2 | 19.5 |
|  | −100 | 16.4 | 17.0 |
|  | −50 | 13.2 | 14.0 |
|  | 0 | 4.1 | 4.5 |
|  | 50 | 2.1 | 2.3 |
|  | 100 | 1.2 | 1.4 |
|  | 300 | 0.5 | 0.8 |
| Cu—Ag—Si | −200 | 21.8 | 22.2 |
|  | −100 | 19.1 | 20.3 |
|  | −50 | 16.5 | 17.2 |
|  | 0 | 5.3 | 6.2 |
|  | 50 | 4.8 | 5.3 |
|  | 100 | 3.0 | 3.4 |
|  | 300 | 0.8 | 1.6 |

The present inventor further fabricated samples of the second modification of the first embodiment. The Fe-base soft magnetic crystalline layers 3/5 were formed of Fe-Hf-C alloy, and Fe content, Hf content and C content were 84 percent by atom, 9 percent by atom and 7 percent by atom, respectively. The Fe-base soft magnetic crystalline layers 3/5 were 1.64 teslas in saturation magnetic flux density. The non-magnetic spacer layer 4 was formed of Cu, Ag or Cu-Ag-Si alloy, and the Cu-Ag-Si alloy contained Cu at 45 percent by atom, Ag at 35 percent by atom and Si at 20 percent by atom. The Co-base magnetic crystalline layers 6/7 were formed of Co-Zr-B alloy which had Co at 82 percent by atom, Zr at 8 percent by atom and B at 10 percent by atom, respectively. The Co-Zr-B alloy layers were regulated to 0.5 nanometer thick.

The samples of the spin valve type multilayered magnetic structure were grown at different substrate temperatures. After the growth, the samples were snnealed in vacuum at 550 degrees in centigrade for 40 minutes. The heat treatment was carried out in magnetic field of 5000 oersted in the same direction as the magnetic field during the growth for a first group of samples, and was carried out without magnetic field for a second group of samples. The change of magneto-resistance was measured, and the result was written in Table 6.

When the samples were grown at −50 degrees in centigrade or less, each of the samples of the spin valve achieved a large magnetoresistance ratio greater than 10 percent regardless of the material of the non-magnetic spacer 4. The samples annealed in the magnetic field achieved a large magnetoresistance ratio rather than the samples annealed without magnetic field.

The present inventor further evaluated samples having Fe-Hf-C alloy layers less than 1.2 teslas in saturation magnetic flux density. The samples did not achieve a large magnetoresistance ratio greater than 10 percent.

The present inventor further fabricated samples of third and fourth modifications of the first embodiment, and evaluated them. The result was similar to that of the second modification.

The present inventor changed the thickness of the Co-Zr-B layers between 0.1 nanometer to 1.0 nanometer, and confirmed that the Co-Zr-B layers enlarged the magneto-resistance ratio of the spin valve rather than the multilayered magnetic structure shown in FIG. 1.

TABLE 6

| Spacer layer | Substrate temp. (° C.) | MR Ratio grown without magnetic field (%) | MR Ratio grown in magnetic field (%) |
|---|---|---|---|
| Cu | −200 | 18.2 | 20.3 |
|  | −100 | 16.1 | 17.7 |
|  | −50 | 12.8 | 14.5 |
|  | 0 | 5.1 | 5.2 |
|  | 50 | 2.9 | 3.2 |
|  | 100 | 2.1 | 2.4 |
|  | 300 | 1.6 | 1.8 |
| Ag | −200 | 19.7 | 21.3 |
|  | −100 | 17.5 | 18.5 |
|  | −50 | 13.8 | 14.0 |
|  | 0 | 4.2 | 4.6 |
|  | 50 | 2.3 | 2.9 |
|  | 100 | 0.9 | 1.4 |
|  | 300 | 0.5 | 0.7 |
| Cu—Ag—Si | −200 | 22.1 | 23.3 |
|  | −100 | 20.2 | 20.6 |
|  | −50 | 15.0 | 16.0 |
|  | 0 | 5.0 | 5.3 |
|  | 50 | 3.9 | 4.3 |
|  | 100 | 2.6 | 2.8 |
|  | 300 | 1.2 | 1.5 |

The present inventor further fabricated samples of the second modification of the first embodiment. The Fe-base soft magnetic crystalline layers 3/5 were formed of Fe-Sc-B alloy, and Fe content, Sc content and B content were 82 percent by atom, 3 percent by atom and 15 percent by atom, respectively. The Fe-base soft magnetic crystalline layers 3/5 were 1.88 teslas in saturation magnetic flux density. The non-magnetic spacer layer 4 was formed of Cu, Ag or Cu-Ag-Si alloy, and the Cu-Ag-Si alloy contained Cu at 75 percent by atom, Ag at 15 percent by atom and Si at 10 percent by atom. The Co-base magnetic crystalline layers 6/7 were formed of Co-Zr-B alloy which had Co at 82 percent by atom, Zr at 8 percent by atom and B at 10 percent by atom, respectively. The Co-Zr-B alloy layers were regulated to 0.5 nanometer thick.

The samples of the spin valve type multilayered magnetic structure were grown at different substrate temperatures. After the growth, the samples were annealed in vacuum at 550 degrees in centigrade for 40 minutes. The heat treatment was carried out in magnetic field of 5000 oersted in the same direction as the magnetic field during the growth for a first group of samples, and was carried out without magnetic field for a second group of samples. The change of magneto-resistance was measured, and the result was written in Table 7.

When the samples were grown at −50 degrees in centigrade or less, each of the samples of the spin valve achieved a large magnetoresistance ratio greater than 10 percent regardless of the material of the non-magnetic spacer 4. The samples annealed in the magnetic field achieved a large magnetoresistance ratio rather than the samples annealed without magnetic field.

The present inventor further evaluated samples having Fe-Sc-B alloy layers less than 1.2 teslas in saturation magnetic flux density. The samples did not achieve a large magnetoresistance ratio greater than 10 percent.

The present inventor further fabricated samples of third and fourth modifications of the first embodiment, and evaluated them. The result was similar to that of the second modification.

The present inventor changed the thickness of the Co-Zr-B layers between 0.1 nanometer to 1.0 nanometer, and confirmed that the Co-Zr-B layers enlarged the magneto-resistance ratio of the spin valve rather than the multilayered magnetic structure shown in FIG. 1.

TABLE 7

| Spacer layer | Substrate temp. (° C.) | MR Ratio grown without magnetic field (%) | MR Ratio grown in magnetic field (%) |
|---|---|---|---|
| Cu | −200 | 23.1 | 24.0 |
|  | −100 | 20.3 | 22.1 |
|  | −50 | 17.4 | 18.5 |
|  | 0 | 6.1 | 6.8 |
|  | 50 | 4.0 | 5.2 |
|  | 100 | 3.5 | 4.6 |
|  | 300 | 2.9 | 3.6 |
| Ag | −200 | 23.3 | 24.2 |
|  | −100 | 21.4 | 22.3 |
|  | −50 | 19.6 | 20.8 |
|  | 0 | 5.2 | 5.7 |
|  | 50 | 4.8 | 5.1 |
|  | 100 | 3.2 | 3.6 |
|  | 300 | 1.5 | 2.3 |
| Cu—Ag—Si | −200 | 23.3 | 24.3 |
|  | −100 | 21.4 | 22.5 |
|  | −50 | 19.2 | 20.4 |
|  | 0 | 6.0 | 7.3 |
|  | 50 | 5.3 | 5.9 |
|  | 100 | 3.8 | 4.1 |
|  | 300 | 1.5 | 2.3 |

Evaluation for Second Embodiment

The present inventor fabricated samples of the multilayered magnetic structures implementing the second embodiment.

The present inventor formed Fe-base alloy layers expressed as Fe-M-X of the afore-mentioned combinations between "M" and "X", Cu-Ag-Me alloy layers of the afore-mentioned combinations between Cu, Ag and "Me" and Co-base alloy layers expressed as Co-M-B of the afore-mentioned combinations between Co, B and "M". The present inventor evaluated the crystal structure and magnetic properties of the Fe-base alloy layers, the Cu-Ag-Me alloy layers and the Co-base alloy layers. However, the crystal structure and the magnetic properties were not dependent on the composition of the alloy layers. For this reason, description is hereinbelow focused on Fe-Ta-C alloy, Cu-Ag-Si alloy and the Co-Zr-B alloy. The ferromagnetic blocks 14a/14b were formed of Co-Pt alloy. In order to make the contact between the ferromagnetic blocks 14a/14b and the Fe-base soft magnetic crystalline layer 11 magnetically perfect, the Fe-base soft magnetic crystalline layer 11 was shaped into a trapezoid by using a lithography and an ion-milling.

Samples of Second Embodiment and Second to Fourth Modifications thereof

The present inventor fabricated samples of the second embodiment. The Fe-base soft magnetic crystalline layers 11/13 were formed of Fe-Ta-C alloy, and Fe content, Ta content and C content were 78 percent by atom, 11 percent by atom and 11 percent by atom, respectively. The Fe-base soft magnetic crystalline layers 11/13 were 1.48 teslas in saturation magnetic flux density, and were regulated to 3.5 nanometers thick.

The non-magnetic spacer layer 12 was formed of Cu, Ag or Cu-Ag-Si alloy, and the Cu-Ag-Si alloy contained Cu at 75 percent by atom, Ag at 15 percent by atom and Si at 10 percent by atom. The non-magnetic spacer layer 12 was 3.0 nanometers thick. The ferromagnetic blocks 14a/14b were formed of Co-Pt alloy with a large coercivity.

The samples of the spin valve type multilayered magnetic structure were grown at different substrate temperature (see Table 8), and were annealed in vacuum at 550 degrees in centigrade for 40 minutes in magnetic field of 8000 oersted. The present inventor measured the magnetoresistance ratio as shown in Table 8.

The present inventor further fabricated samples of multilayered magnetic structure through the growing technique and the heat treatment described above, and measured the mean grain size of these sample. The sample had the Fe-Ta-C alloy layer of 200 nanometers thick, the Co-Pt blocks of 150 nanometers thick, Cu, Ag or the Cu-Ag-Si alloy layer of 100 nanometers thick and the Fe-Ta-C alloy layer of 200 nanometers thick. The mean grain size of these layers was measured through the transmission electron microscope, and were written in Table 8.

When the non-magnetic spacer layer 12 was formed of Cu or Ag, each of the samples of the second embodiment achieved a magnetoresistance ratio more than 10 percent in so far as the Fe-base soft magnetic crystalline layers 11/13 had the mean grain size equal to or less than 30 nanometers. In case of the samples using the Cu-Ag-Si alloy, a large magnetoresistance ratio more than 10 percent was achieved only when both of the Fe-Ta-C alloy and the Cu-Ag-Si alloy had the mean grain size equal to or less than 30 nanometers.

The present inventor further evaluated samples of the first embodiment which had Fe-Ta-C alloy layers less than 1.2 teslas. These samples did not achieve a large magnetoresistance ratio more than 10 percent even if the mean grain size was equal to or less than 30 nanometers.

TABLE 8

| Spacer layer | Substrate temp. (° C.) | Grain Size of Fe—Ta—C (nm) | Grain Size of Spacer (nm) | MR ratio (%) |
| --- | --- | --- | --- | --- |
| Cu | −200 | 20 | 100 | 17.8 |
|  | −100 | 25 | 120 | 16.5 |
|  | −50 | 30 | 110 | 13.4 |
|  | 0 | 80 | 120 | 5.3 |
|  | 50 | 190 | 200 | 3.2 |
|  | 100 | 230 | 230 | 2.5 |
|  | 300 | 360 | 360 | 2.0 |
| Ag | −200 | 20 | 130 | 17.1 |
|  | −100 | 25 | 150 | 16.8 |
|  | −50 | 30 | 150 | 13.4 |
|  | 0 | 80 | 150 | 4.2 |
|  | 50 | 190 | 150 | 2.1 |
|  | 100 | 230 | 200 | 1.2 |
|  | 300 | 360 | 300 | 0.5 |
| Cu—Ag—Si | −200 | 20 | 20 | 20.3 |
|  | −100 | 25 | 25 | 19.4 |
|  | −50 | 30 | 30 | 14.8 |
|  | 0 | 80 | 80 | 5.3 |
|  | 50 | 190 | 200 | 4.8 |
|  | 100 | 230 | 250 | 2.7 |
|  | 300 | 360 | 350 | 0.5 |

The present inventor fabricated samples of the second to fourth modifications of the second embodiment shown in FIGS. 8 to 10. The Fe-base soft magnetic crystalline layers 11/13 were formed of Fe-Ta-C alloy, and Fe content, Ta content and C content were 78 percent by atom, 11 percent by atom and 11 percent by atom, respectively. The Fe-base soft magnetic crystalline layers 11/13 of the Fe-Ta-C alloy had saturation magnetic flux density of 1.48 teslas. The non-magnetic spacer layer 12 was formed of Cu, Ag or Cu-Ag-Si alloy, and the Cu-Ag-Si alloy contained Cu at 75 percent by atom, Ag at 15 percent by atom and Si at 10 percent by atom. The Co-base magnetic crystalline layers 15a/15b were formed of Co-Zr-B alloy which had Co at 82 percent by atom, Zr at 8 percent by atom and B at 10 percent by atom, respectively. The Co-Zr-B alloy layers were regulated to 0.5 nanometer thick.

The samples of the spin valve type multilayered magnetic structure were grown at different substrate temperatures. After the growth, the samples were annealed in vacuum at 550 degrees in centigrade for 40 minutes. The heat treatment was carried out in magnetic field of 5000 oersted for a first group of the samples, and was carried out without magnetic field for a second group of the samples. The change of magneto-resistance was measured, and the result was written in Table 9.

When the samples were grown at −50 degrees in centigrade or less, each of the samples of the spin valve achieved a large magnetoresistance ratio greater than 10 percent regardless of the material of the non-magnetic spacer 4. The samples annealed in the magnetic field achieved a large magnetoresistance ratio rather than the samples annealed without magnetic field.

The present inventor further evaluated samples having Fe-Ta-C alloy layers less than 1.2 teslas in saturation magnetic flux density. The samples did not achieve a large magnetoresistance ratio greater than 10 percent.

The present inventor further fabricated samples of third and fourth modifications of the first embodiment, and evaluated them. The result was similar to that of the second modification.

TABLE 9

| Spacer layer | Substrate temp. (° C.) | MR Ratio grown without magnetic field (%) | MR Ratio grown in magnetic field (%) |
| --- | --- | --- | --- |
| Cu | −200 | 18 | 19.8 |
|  | −100 | 15.3 | 17.0 |
|  | −50 | 12.2 | 13.5 |
|  | 0 | 5.1 | 5.2 |
|  | 50 | 3.0 | 3.2 |
|  | 100 | 2.5 | 2.6 |
|  | 300 | 2.0 | 1.9 |
| Ag | −200 | 17 | 19.5 |
|  | −100 | 15.5 | 18.0 |
|  | −50 | 12.2 | 14.0 |
|  | 0 | 4.3 | 4.8 |
|  | 50 | 2.1 | 2.4 |
|  | 100 | 1.2 | 1.2 |
|  | 300 | 0.5 | 0.7 |
| Cu—Ag—Si | −200 | 19.8 | 20.8 |
|  | −100 | 18.3 | 19.2 |
|  | −50 | 15.4 | 15.2 |
|  | 0 | 5.0 | 5.3 |
|  | 50 | 4.2 | 4.3 |
|  | 100 | 2.3 | 2.4 |
|  | 300 | 0.8 | 1.6 |

Evaluation for Third Embodiment

The present inventor fabricated samples of the multilayered magnetic structures implementing the third embodiment.

Co-Cr-Ta alloy was used for the magnetic layer 22 with a large coercivity, and the magnetic layer 24 was formed of the Fe-M-X alloy. The present inventor formed the Fe-M-X alloy layers of the afore-mentioned combinations between "M" and "X", Cu-Ag-Me alloy layers of the aforementioned combinations between Cu, Ag and "Me" and Co-base alloy layers expressed as Co-M-B of the aforementioned combinations between Co, B and "M". The present inventor evaluated the crystal structure and magnetic properties of the Fe-M-X alloy layers, the Cu-Ag-Me alloy layers and the Co-M-B alloy layers. However, the crystal structure and the magnetic properties were not dependent on the composition of the alloy. For this reason, description is hereinbelow focused on Fe-Ta-C alloy, Cu-Ag-Si alloy and the Co-Zr-B alloy. The Co-Cr-Ta alloy was grown to 100 nanometers thick on substrates at 100 degrees in centigrade, and the coercivity of the Co-Cr-Ta alloy was 12000 oersted.

Samples of Third Embodiment and Second to Fourth Modifications thereof

The present inventor fabricated samples of the third embodiment shown in FIG. 11. The lower magnetic layers 22 were formed of the Co-Cr-Ta alloy, and were regulated to 20 nanometers thick.

The non-magnetic spacer layer 23 was formed of Cu, Ag or Cu-Ag-Si alloy, and the Cu-Ag-Si alloy contained Cu at 75 percent by atom, Ag at 15 percent by atom and Si at 10 percent by atom. The non-magnetic spacer layers 23 were regulated to 3 nanometers thick.

The upper magnetic layers 24 were formed of the Fe-Ta-C alloy, and Fe content, Ta content and C content were 78 percent by atom, 11 percent by atom and 11 percent by atom, respectively. The upper magnetic layers 24 were regulated to 2.5 nanometers thick, and the Fe-Ta-C alloy layers 24 had the saturation magnetic flux density of 1.48 teslas.

The samples of the spin valve type multilayered magnetic structure were grown at different substrate temperature (see Table 10), and were annealed in vacuum at 550 degrees in centigrade for 40 minutes in magnetic field of 8000 oersted. The present inventor measured the magnetoresistance ratio as shown in Table 10.

The present inventor further fabricated samples of multilayered magnetic structure through the growing technique and the heat treatment described above, and measured the mean grain size of these sample. The sample had the Co-Cr-Ta alloy layer of 200 nanometers thick, the Cu, Ag or the Cu-Ag-Si alloy layer of 100 nanometers thick and the Fe-Ta-C alloy layer of 200 nanometers thick. The mean grain size of these layers was measured through the transmission electron microscope, and were written in Table 10.

When the non-magnetic spacer layer 23 was formed of Cu or Ag, each of the samples of the third embodiment achieved a magnetoresistance ratio more than 10 percent in so far as the Fe-Ta-C alloy layer 24 had the mean grain size equal to or less than 30 nanometers. In case of the samples using the Cu-Ag-Si alloy, a large magnetoresistance ratio more than 10 percent was achieved only when both of the Fe-Ta-C alloy and the Cu-Ag-Si alloy had the mean grain size equal to or less than 30 nanometers.

The present inventor further evaluated comparative samples which had Fe-Ta-C alloy layers less than 1.2 teslas. These comparative samples did not achieve a large magnetoresistance ratio more than 10 percent even if the mean grain size was equal to or less than 30 nanometers.

TABLE 10

| Spacer layer | Substrate temp. (° C.) | Grain Size of Fe—Ta—C (nm) | Grain Size of Spacer (nm) | MR ratio (%) |
| --- | --- | --- | --- | --- |
| Cu | -200 | 20 | 100 | 17.8 |
|  | -100 | 25 | 120 | 16.5 |
|  | -50 | 30 | 110 | 13.4 |
|  | 0 | 80 | 120 | 5.3 |
|  | 50 | 190 | 200 | 3.2 |
|  | 100 | 230 | 230 | 2.5 |
|  | 300 | 360 | 360 | 2.0 |
| Ag | -200 | 20 | 130 | 17.1 |
|  | -100 | 25 | 150 | 16.8 |
|  | -50 | 30 | 150 | 13.4 |
|  | 0 | 80 | 150 | 4.2 |
|  | 50 | 190 | 150 | 2.1 |
|  | 100 | 230 | 200 | 1.2 |
|  | 300 | 360 | 300 | 0.5 |
| Cu—Ag—Si | -200 | 20 | 20 | 20.3 |
|  | -100 | 25 | 25 | 19.4 |
|  | -50 | 30 | 30 | 14.8 |
|  | 0 | 80 | 80 | 5.3 |
|  | 50 | 190 | 200 | 4.8 |
|  | 100 | 230 | 250 | 2.7 |
|  | 300 | 360 | 350 | 0.5 |

The present inventor fabricated samples of the second to fourth modifications of the third embodiment shown in FIGS. 13 to 15. The lower magnetic layers 22 were formed of Co-Cr-Ta alloy, and were regulated to 20 nanometers thick. The non-magnetic spacer layers 23 were formed of Cu, Ag or Cu-Ag-Si alloy, and the Cu-Ag-Si alloy contained Cu at 75 percent by atom, Ag at 15 percent by atom and Si at 10 percent by atom. The non-magnetic spacer layers 23 were regulated to 3 nanometers thick. The upper magnetic layers 24 were formed of Fe-Ta-C alloy, and Fe content, Ta content and C content were 78 percent by atom, 11 percent by atom and 11 percent by atom, respectively. The Fe-Ta-C alloy layers had saturation magnetic flux density of 1.48 teslas, and were regulated to 2.5 nanometers thick. The Co-base magnetic crystalline layers 25a/25b were formed of Co-Zr-B alloy which had Co at 82 percent by atom, Zr at 8 percent by atom and B at 10 percent by atom, respectively. The Co-Zr-B alloy layers were regulated to 0.5 nanometer thick.

The samples of the spin valve type multilayered magnetic structure were grown at different substrate temperatures. After the growth, the samples were annealed in vacuum at 550 degrees in centigrade for 40 minutes. The heat treatment was carried out in magnetic field of 5000 oersted for a first group of the samples, and was carried out without magnetic field for a second group of the samples. The change of magneto-resistance was measured, and the result was written in Table 11.

When the samples were grown at -50 degrees in centigrade or less, each of the samples of the spin valve achieved a large magnetoresistance ratio greater than 10 percent regardless of the material of the non-magnetic spacer 4. The samples annealed in the magnetic field achieved a large magnetoresistance ratio rather than the samples annealed without magnetic field.

The present inventor further evaluated comparative samples having Fe-Ta-C alloy layers less than 1.2 teslas in saturation magnetic flux density. The comparative samples did not achieve a large magnetoresistance ratio greater than 10 percent.

The present inventor further fabricated samples of third and fourth modifications of the third embodiment, and evaluated them. The result was similar to that of the second modification.

TABLE 11

| Spacer layer | Substrate temp. (° C.) | MR Ratio grown without magnetic field (%) | MR Ratio grown in magnetic field (%) |
|---|---|---|---|
| Cu | −200 | 18 | 19.8 |
|  | −100 | 15.3 | 17.0 |
|  | −50 | 12.2 | 13.5 |
|  | 0 | 5.1 | 5.2 |
|  | 50 | 3.0 | 3.2 |
|  | 100 | 2.5 | 2.6 |
|  | 300 | 2.0 | 1.9 |
| Ag | −200 | 17 | 19.5 |
|  | −100 | 15.5 | 18.0 |
|  | −50 | 12.2 | 14.0 |
|  | 0 | 4.3 | 4.8 |
|  | 50 | 2.1 | 2.4 |
|  | 100 | 1.2 | 1.2 |
|  | 300 | 0.5 | 0.7 |
| Cu—Ag—Si | −200 | 19.8 | 20.8 |
|  | −100 | 18.3 | 19.2 |
|  | −50 | 15.4 | 15.2 |
|  | 0 | 5.0 | 5.3 |
|  | 50 | 4.2 | 4.3 |
|  | 100 | 2.3 | 2.4 |
|  | 300 | 0.8 | 1.6 |

As will be appreciated from the foregoing description, the spin-valve type multilayered magnetic structure achieves a large magnetoresistance ratio equal to or greater than 10 percent by virtue of the Fe-base soft magnetic crystalline layer having the saturation magnetic flux density equal to or greater than 1.2 teslas and the mean grain size equal to or less than 30 nanometers.

The spin valve type multilayered magnetic structure is not dependent on how the magnetization direction of one of the magnetic layers is fixed.

When the Co-based magnetic crystalline layers are inserted between the Fe-base soft magnetic crystalline layer or layers and the non-magnetic spacer layer, the magnetoresistance ratio is enlarged.

Although particular embodiments of the present invention have been shown and described, it will be obvious to those skilled in the art that various changes and modifications may be made without departing from the spirit and scope of the present invention.

What is claimed is:

1. A multilayered magnetic structure, comprising:

a first magnetic layer formed of a Fe-base magnetic crystalline alloy having a first composition expressed by as Fe-M-X where M is at least one transition metal selected from the group consisting of Sc, Ti, V, Cr, Y, Zr, Nb, Mo, La, Hf, Ta and W, and X is at least one element selected from the group consisting of C, B and N, said Fe-base magnetic crystalline alloy having a mean grain size equal to or less than 30 nanometers;

a second magnetic layer opposed to said first magnetic layer for changing a relative angle between a first direction of magnetization of said first magnetic layer and a second direction of magnetization thereof in the presence of a magnetic field;

a non-magnetic spacer layer sandwiched between said first magnetic layer and said second magnetic layer; and an antiferromagnetic layer attached to one of said first magnetic layer and said second magnetic layer so as to fix the magnetization thereof, wherein said second magnetic layer is formed of said Fe-base magnetic crystalline alloy having the mean grain size equal to or less than 30 nanometers, wherein said Fe-base magnetic crystalline alloy of both said first and second magnetic layers has a saturation magnetic flux density equal to or greater than 1.2 teslas, wherein said Fe-base magnetic crystalline alloy of both said first and second magnetic layers contains said transition metal ranging from 2 percent to 13 percent by atom and said element X ranging from 0.5 percent to 18 percent by atom, wherein said non-magnetic spacer layer is formed of a material selected from the group consisting of Cu, Ag, and a Cu-Ag-Me alloy, where Me is one of Si, Ge and P, and said Cu-Ag-Me alloy has a Ag content ranging from 15 percent to 90 percent by atom and Me ranging from 5 percent to 40 percent by atom, and wherein said Cu-Ag-Me alloy has a mean grain size equal to or less than 30 nanometers.

2. The multilayered magnetic structure as set forth in claim 1, in which said first magnetic layer and said second magnetic layer are formed of said Fe-base magnetic crystalline alloy selected from the group consisting of Fe-Ta-C, Fe-Hf-C and Fe-Sc-B, and said antiferromagnetic layer and said non-magnetic spacer layer are respectively formed of NiO and a material selected from the group consisting of Cu, Ag and a Cu-Ag-Si alloy.

3. The multilayered magnetic structure as set forth in claim 2, in which said first and second magnetic layers are 3.5 nanometers thick, said non-magnetic spacer layer is 3.0 nanometers thick, and said antiferromagnetic layer is equal to or less than 40 nanometers thick.

4. A multilayered magnetic structure as set forth in claim 3, wherein said antiferromagnetic layer has a thickness of between 20 and 40 nanometers.

5. The multilayered magnetic structure as set forth in claim 1, further comprising at least one third magnetic layer inserted between one of said first and second magnetic layers and said non-magnetic spacer layer and formed of a Co-base magnetic crystalline alloy expressed as Co-M-B where M is at least one transition metal selected from the group consisting of Sc, Ti, V, Cr, Y, Zr, Nb, Mo, La, Hf, Ta and W, and said Co-base magnetic crystalline alloy has a mean grain size equal to or less than 30 nanometers.

6. The multilayered magnetic structure as set forth in claim 5, in which said Co-base magnetic crystalline alloy contains said M ranging from 2 percent to 13 percent by atom and B ranging from 5 percent to 25 percent by atom.

7. The multilayered magnetic structure as set forth in claim 5, in which said second magnetic layer is formed of said Fe-base magnetic crystalline alloy having a saturation magnetic flux density equal to or greater than 1.2 teslas, wherein said first and second magnetic layers are selected from the group consisting of Fe-Ta-C, Fe-hf-C and Fe-Sc-B, said non-magnetic spacer layer is formed of a material selected from Cu, Ag and Cu-Ag-Si and said at least one third magnetic layer is formed of Co-Zr-B.

8. The multilayered magnetic structure as set forth in claim 1, said multilayered magnetic structure further comprising a ferromagnetic means attached to both sides of one of said first magnetic layer and said second magnetic layer.

9. The multilayered magnetic structure as set forth in claim 8, in which said Fe-base magnetic crystalline alloy has a saturation magnetic flux density equal to or greater than 1.2 teslas.

10. The multilayered magnetic structure as set forth in claim 8, in which said first and second magnetic layers are formed of Fe-Ta-C alloy, said non-magnetic spacer layer is formed of a material selected from the group consisting of Cu, Ag and Cu-Ag-Si, and said ferromagnetic means is formed of Co-Pt.

11. The multilayered magnetic structure as set forth in claim 8, further comprising at least one third magnetic layer inserted between one of said first and second magnetic layers and said non-magnetic spacer layer and formed of a Co-base magnetic crystalline alloy expressed as Co-M-B where M is at least one transition metal selected from the group consisting of Sc, Ti, V, Cr, Y, Zr, Nb, Mo, La, Hf, Ta and W, and said Co-base magnetic crystalline alloy has a mean grain size equal to or less than 30 nanometers.

12. The multilayered magnetic structure as set forth in claim 11, in which said Co-base magnetic crystalline alloy contains said M ranging from 2 percent to 13 percent by atom and B ranging from 5 percent to 25 percent by atom.

13. The multilayered magnetic structure as set forth in claim 11, in which said first and second magnetic layers are formed of Fe-Ta-C, said non-magnetic spacer layer is formed of a material selected from the group consisting of Cu, Ag and Cu-Ag-Si, said ferromagnetic means is formed of Co-Pt, and said at least one third magnetic layer is formed of Co-Zr-B having a mean grain size equal to or less than 30 nanometers.

14. The multilayered magnetic structure as set forth in claim 1, in which said second magnetic layer is formed of a magnetic material larger in coercivity than said first magnetic layer.

15. The multilayered magnetic structure as set forth in claim 14, in which said second magnetic layer is formed of Co-Cr-Ta alloy.

16. The multilayered magnetic structure as set forth in claim 1, wherein said first magnetic layer has a top surface, a bottom surface, and opposing side surfaces, wherein said antiferromagnetic layer is attached to said top surface of said first magnetic layer, said multilayered magnetic structure further comprising:
a pair of ferromagnetic blocks respectively attached to said opposing side surfaces of said first magnetic layer.

17. A multilayered magnetic structure, comprising:
a first magnetic layer formed of an Fe-base magnetic crystalline alloy having a first composition expressed by as Fe-M-X where M is at least one transition metal selected from the group consisting of Sc, Ti, V, Cr, Y, Zr, Nb, Mo, La, Hf, Ta and W, and X is at least one element selected from the group consisting of C, B and N, said Fe-base magnetic crystalline alloy having a mean grain size equal to or less than 30 nanometers;
a second magnetic layer opposed to said first magnetic layer for changing a relative angle between a first direction of magnetization of said first magnetic layer and a second direction of magnetization thereof in the presence of a magnetic field;
a non-magnetic spacer layer sandwiched between said first magnetic layer and said second magnetic layer; and
an antiferromagnetic layer attached to one of said first magnetic layer and said second magnetic layer so as to fix the magnetization thereof,
wherein said second magnetic layer is formed of a Co-Cr-Ta alloy having the mean grain size equal to or less than 30 nanometers,
wherein said Fe-base magnetic crystalline alloy has a saturation magnetic flux density equal to or greater than 1.2 teslas,
wherein said Fe-base magnetic crystalline alloy contains said transition metal ranging from 2 percent to 13 percent by atom and said element X ranging from 0.5 percent to 18 percent by atom,
wherein said non-magnetic spacer layer is formed of a material selected from the group consisting of Cu, Ag, and a Cu-Ag-Me alloy, where Me is one of Si, Ge and P, and said Cu-Ag-Me alloy has a Ag content ranging from 15 percent to 90 percent by atom and Me ranging from 5 percent to 40 percent by atom,
wherein said Cu-Ag-Me alloy has a mean grain size equal to or less than 30 nanometers, and
wherein said second magnetic layer has a larger coercive force than said first magnetic layer.

18. The multilayered magnetic structure as set forth in claim 17, further comprising:
a first Co-based magnetic crystalline layer disposed between said second magnetic layer and said non-magnetic spacer layer; and
a second Co-based magnetic crystalline layer disposed between said first magnetic layer and said non-magnetic spacer layer,
whereby a magnetoresistance ratio of said multilayered magnetic structure is enhanced by virtue of said first and second Co-based magnetic crystalline layers.

19. The multilayered magnetic structure as set forth in claim 17, further comprising at least one third magnetic layer inserted between one of said first and second magnetic layers and said non-magnetic spacer layer and formed of a Co-base magnetic crystalline alloy expressed as Co-M-B where M is at least one transition metal selected from the group consisting of Sc, Ti, V, Cr, Y, Zr, Nb, Mo, La, Hf, Ta and W, and said Co-base magnetic crystalline alloy has a mean grain size equal to or less than 30 nanometers.

20. The multilayered magnetic structure as set forth in claim 19, in which said Co-base magnetic crystalline alloy contains said M ranging from 2 percent to 13 percent by atom and B ranging from 5 percent to 25 percent by atom.

21. The multilayered magnetic structure as set forth in claim 19, in which said first magnetic layer is formed of Fe-Ta-C, said second magnetic layer is formed of Co-Cr-Ta alloy, and said at least one third magnetic layer is formed of Co-Zr-B having a mean grain size equal to or less than 30 nanometers.

22. A Magneto-resistance element, comprising:
a first magnetic layer formed of an Fe-base crystalline alloy having a mean grain size equal to or less than 30 nanometers, the first magnetic layer having a first composition expressed by as Fe-M-X where M is at least one transition metal selected from the group consisting of Sc, Ti, V, Cr, Y, Zr, Nb, Mo, La, Hf, Ta and W, and X is at least one element selected from the group consisting of C, B and N;
a second magnetic layer formed of a Co-base magnetic crystalline alloy having a mean grain size equal to or less than 30 nanometers, said second magnetic layer opposed to said first magnetic layer for changing a relative angle between a first direction of magnetization of said first magnetic layer and a second direction of magnetization thereof in the presence of a magnetic field; and
a non-magnetic spacer layer sandwiched between said first magnetic layer and said second magnetic layer, wherein said Fe-based magnetic crystalline alloy has a saturation magnetic flux density equal to or greater than 1.2 teslas, wherein said Fe-base magnetic crystalline alloy contains said transition metal ranging from 2 percent to 13 percent by atom and said element X ranging from 0.5 percent to 18 percent by atom, wherein said non-magnetic spacer layer is formed of a material selected from the group consisting of Cu, Ag, and a Cu-Ag-Me alloy, where Me is one of Si, Ge and P, and said Cu-Ag-Me alloy has a Ag content ranging from 15 percent to 90 percent by atom and Me ranging from 5 percent to 40 percent by atom, wherein said Cu-Ag-Me alloy has a mean grain size equal to or less than 30 nanometers, wherein said second magnetic layer is formed of a Co-Cr-Ta alloy, and wherein said second magnetic layer has a greater coercive force than said first magnetic layer.

23. A process of fabricating a multilayered magnetic structure of claim 1 or claim 12 comprising the steps of:

a) preparing a substrate;

b) forming, by sputtering, a multilayered magnetic structure serving as a spin valve on a major surface of said substrate at a certain temperature equal to or less than −50 degrees in centigrade under application of a first magnetic field in parallel to said major surface of said substrate; and c) treating said multilayered magnetic structure with heat.

24. The process as set forth in claim 23, in which said heat treatment in said step c) is carried out in a second magnetic field in parallel to said major surface of said substrate.

* * * * *